US012312850B2

(12) United States Patent
Martin et al.

(10) Patent No.: US 12,312,850 B2
(45) Date of Patent: May 27, 2025

(54) SLIDING DOOR SYSTEMS

(71) Applicant: Schlage Lock Company LLC, Carmel, IN (US)

(72) Inventors: Ryan Martin, Mill Creek, WA (US); Jeff Morovich, Everett, WA (US); Dustin Swartz, Bothell, WA (US)

(73) Assignee: Schlage Lock Company LLC, Carmel, IN (US)

(*) Notice: Subject to any disclaimer, the term of this patent is extended or adjusted under 35 U.S.C. 154(b) by 124 days.

(21) Appl. No.: 17/578,003

(22) Filed: Jan. 18, 2022

(65) Prior Publication Data

US 2022/0136303 A1 May 5, 2022

Related U.S. Application Data

(62) Division of application No. 16/404,003, filed on May 6, 2019, now abandoned.

(51) Int. Cl.
*E05F 1/16* (2006.01)
*E05F 5/00* (2017.01)

(52) U.S. Cl.
CPC ................ *E05F 1/16* (2013.01); *E05F 5/003* (2013.01); *E05Y 2201/264* (2013.01); *E05Y 2600/46* (2013.01); *E05Y 2900/132* (2013.01)

(58) Field of Classification Search
CPC ... E05F 3/227; E05F 5/003; E05F 1/08; E05F 1/16; E06B 3/46; E06B 3/4636;
(Continued)

(56) References Cited

U.S. PATENT DOCUMENTS

| | | | |
|---|---|---|---|
| 3,076,222 | A | 2/1963 | Sloan |
| 3,105,272 | A | 10/1963 | Tucker, Jr. |

(Continued)

FOREIGN PATENT DOCUMENTS

| | | | | |
|---|---|---|---|---|
| DE | 102018008201 | A1 * | 4/2020 | ................ E05F 1/16 |
| EP | 182351 | A2 | 8/2007 | |

(Continued)

OTHER PUBLICATIONS

Extended European Search Report; European Patent Office; Patent Application No. 20801787.1; Mar. 16, 2023; 9 pages.

(Continued)

*Primary Examiner* — Emily M Morgan
(74) *Attorney, Agent, or Firm* — Taft Stettinius & Hollister LLP

(57) ABSTRACT

An exemplary closure assembly includes a rail assembly and a door assembly movably mounted to the rail assembly. The door assembly includes a rotary damper having a pinion, and the rail assembly includes a rack member operable to engage the pinion. As the door moves from first position to a second position, the rack member engages the pinion, thereby causing the pinion to rotate in a first rotational direction. The rotary damper resists rotation of the pinion in the first direction, thereby slowing movement of the door toward the second position. The rotary damper may be a one-way damper that does not resist rotation of the pinion in a second rotational direction such that the rotary damper does not resist movement of the door from the second position toward the first position.

19 Claims, 15 Drawing Sheets

(58) Field of Classification Search
CPC ........ A47B 88/40; A57H 15/00; A57H 15/02; E05Y 2900/132
See application file for complete search history.

(56) References Cited

U.S. PATENT DOCUMENTS 3,425,162 A 2/1969 Halpern
3,950,952 A 4/1976 Krings
4,099,599 A 7/1978 Randall
4,355,486 A 10/1982 Sherwood
5,207,781 A * 5/1993 Rock .................... A47B 88/467 312/319.1
5,355,624 A 10/1994 Bacon
6,910,557 B2 6/2005 Doombos et al.
6,915,716 B2 * 7/2005 Doornbos ................. F16F 7/08 74/411
7,393,068 B2 7/2008 Sato et al.
7,874,597 B2 1/2011 Tomita et al.
8,079,450 B2 12/2011 Zeilenga et al.
8,210,623 B2 7/2012 Chen et al.
8,307,497 B2 11/2012 Chang et al.
8,366,175 B2 * 2/2013 Schmitt ................. E05C 17/006 16/86 B
8,418,406 B2 4/2013 Zimmer et al.
8,561,352 B2 10/2013 Vogler
8,745,821 B2 6/2014 Chang et al.
8,746,422 B2 6/2014 Zimmer et al.
8,793,839 B2 8/2014 Iwaki
8,899,703 B2 * 12/2014 Chung ................. A47B 88/463 312/334.8
8,925,696 B2 1/2015 Zeilenga et al.
9,388,622 B1 * 7/2016 Paron ...................... E05F 15/56
9,763,518 B2 9/2017 Charest et al.
9,945,167 B2 * 4/2018 Svara ........................ E05F 3/00
10,087,670 B2 10/2018 Grabher
10,138,667 B2 11/2018 Graul et al.
10,208,521 B2 2/2019 Zimmer et al.
10,221,604 B2 3/2019 Zimmer et al.
11,447,998 B2 * 9/2022 Long ......................... E05F 1/16
2001/0008037 A1 * 7/2001 Brustle ................... E05F 5/027 16/71
2003/0189395 A1 * 10/2003 Doornbos ............... E05F 5/003 312/334.1
2004/0237252 A1 * 12/2004 Hoshide .................. E05F 5/003 16/72
2006/0017358 A1 * 1/2006 Sato ..................... A47B 88/463 312/333
2008/0244862 A1 * 10/2008 Tooyama ................ E05F 5/003 16/82
2010/0031468 A1 * 2/2010 Tomiji .................... E05F 5/027 16/49
2010/0037525 A1 2/2010 Sato
2010/0126073 A1 5/2010 Schroeder et al.
2011/0023370 A1 * 2/2011 Zimmer .................... E05F 1/16 49/360
2011/0041284 A1 * 2/2011 Kimura ..................... E05F 5/02 16/49
2011/0154817 A1 * 6/2011 Zimmer .................. F03G 7/065 60/528
2011/0203075 A1 8/2011 Iwaki
2012/0023827 A1 2/2012 Hancock et al.
2012/0124778 A1 5/2012 Sato
2012/0269470 A1 * 10/2012 Zimmer .................... E05F 1/16 384/20
2013/0088132 A1 * 4/2013 Hammerle ............. A47B 88/46 312/319.1
2013/0160240 A1 6/2013 Kenny
2014/0020299 A1 1/2014 Takahashi et al.
2014/0026358 A1 * 1/2014 Saito ......................... E05F 3/00 16/72
2014/0033475 A1 * 2/2014 Saito ......................... E05F 1/16 16/76
2014/0059801 A1 * 3/2014 Saito ......................... E05F 1/16 16/72
2014/0238165 A1 8/2014 Shiroma
2014/0338150 A1 11/2014 Chuang
2016/0076288 A1 * 3/2016 Bantle ..................... E05D 15/36 49/417
2017/0130501 A1 * 5/2017 Svara ........................ E05F 1/16
2017/0196356 A1 * 7/2017 Gasser ...................... E05F 1/16
2018/0184853 A1 7/2018 Wei
2018/0274277 A1 9/2018 Chang
2018/0320430 A1 11/2018 Wei
2019/0309551 A1 10/2019 Hawkinson et al.
2019/0330904 A1 * 10/2019 Svara ........................ E05F 3/22
2020/0080358 A1 3/2020 Ijima et al.
2020/0263469 A1 * 8/2020 Tyler ................... F16F 15/1204
2021/0388656 A1 * 12/2021 Zimmer .................... E05F 1/16

FOREIGN PATENT DOCUMENTS

EP 2549041 A1 1/2013
JP 5102540 B2 12/2012
WO 2005001227 A1 6/2005
WO WO-2007121731 A1 * 11/2007 ................ E05F 1/16
WO 2008034626 A2 3/2008
WO WO-2009100717 A1 * 8/2009 ................ E05F 1/16
WO 2012066883 A1 5/2012
WO 2012076372 A1 6/2012
WO 2015193509 A1 12/2015
WO 2017123147 A1 7/2017
WO WO-2017220797 A1 * 12/2017 ................ E05F 1/08
WO 2018128824 A1 7/2018
WO 2019117828 A2 6/2019

OTHER PUBLICATIONS

English translation of DE 102018008201 Zimmer (Year: 2018).
English translation of JP 5102540 Ishii (Year: 2012).
International Search Report; International Searching Authority; International Application No. PCT/US2020/031647; Aug. 11, 2020; 4 pages.
Written Opinion of the International Searching Authority; International Searching Authority; International Application No. PCT/US2020/031647; Aug. 11, 2020; 6 pages.
Invitation Pursuant to Rule 62a(1) EPC; European Patent Office; Patent Application No. 20801787.1; Dec. 15, 2022; 2 pages.
Communication Pursuant to Article 94(3) EPC; European Patent Office; European Patent Application No. 20801787.1; Feb. 21, 2024; 4 pages.
Canadian Examination Report; Canadian Intellectual Property Office; Canadian Patent Application No. 3,139,318; Jan. 12, 2024; 3 pages.

* cited by examiner

SLIDING DOOR SYSTEMS

CROSS REFERENCE TO RELATED APPLICATIONS

The present application is a divisional of U.S. patent application Ser. No. 16/404,003 filed May 6, 2019, the contents of each of which applications are incorporated herein by reference in their entirety.

TECHNICAL FIELD

The present disclosure generally relates to sliding door systems, and more particularly but not exclusively relates to top-hung sliding door systems.

BACKGROUND

Certain currently available sliding door systems suffer from certain drawbacks and limitations, such as those relating to ease of operation and others. For these reasons among others, there remains a need for further improvements in this technological field.

SUMMARY

An exemplary closure assembly includes a rail assembly and a door assembly movably mounted to the rail assembly. The door assembly includes a rotary damper having a pinion, and the rail assembly includes a rack member operable to engage the pinion. As the door moves from first position to a second position, the rack member engages the pinion, thereby causing the pinion to rotate in a first rotational direction. The rotary damper resists rotation of the pinion in the first direction, thereby slowing movement of the door toward the second position. The rotary damper may be a one-way damper that does not resist rotation of the pinion in a second rotational direction such that the rotary damper does not resist movement of the door from the second position toward the first position. Further embodiments, forms, features, and aspects of the present application shall become apparent from the description and figures provided herewith.

DETAILED DESCRIPTION OF ILLUSTRATIVE EMBODIMENTS

Figure 1:
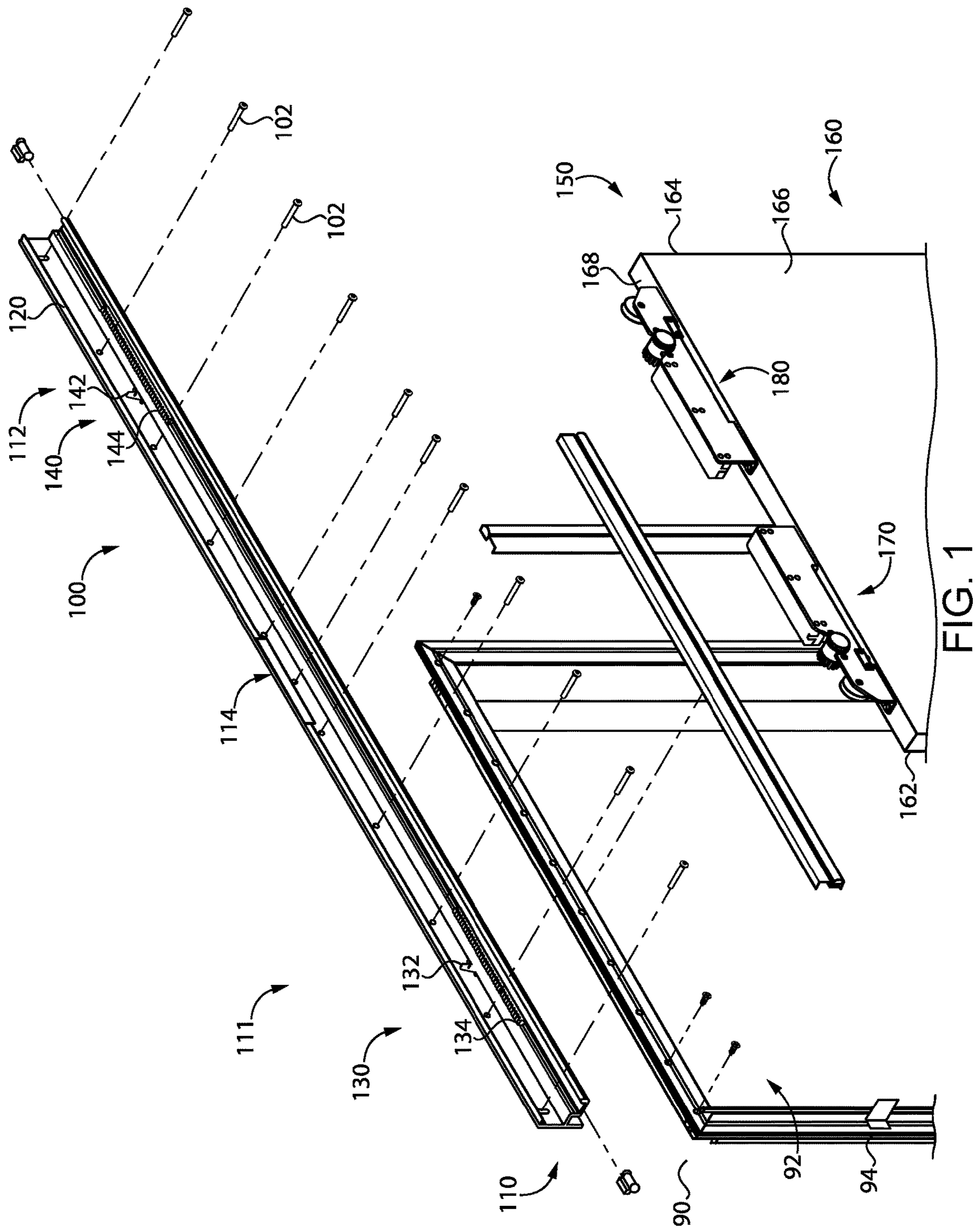
FIG. 1 is an exploded assembly view of a closure assembly according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown certain in specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a closure assembly 100 according to certain embodiments. The closure assembly 100 is mounted to a wall 90 having an opening 92 formed therein, and a doorframe 94 is mounted to the wall 90 and defines the opening 92. The closure assembly 100 includes a rail assembly 110 and a door assembly 150 movably mounted to the rail assembly 110. The door assembly 150 is movable along the rail assembly 110 in opposite opening and closing directions between a closed position in which the door assembly 150 substantially covers the opening 92 and an open position in which the opening 92 is substantially uncovered by the door assembly 150.

The rail assembly 110 has a first end portion 111 and a second end portion 112, and generally includes an elongated rail member 120 and at least one of a closing-side engagement zone 130 or an opening-side engagement zone 140. The closing-side engagement zone 130 is configured to interface with the door assembly 150 as the door assembly 150 approaches the closed position, and the opening-side engagement zone 140 is configured to interface with the door assembly 150 as the door assembly 150 approaches the open position. Further details regarding the interaction of the door assembly 150 with the closing-side engagement zone 130 and the opening-side engagement zone 140 are provided herein.

Figure 2:
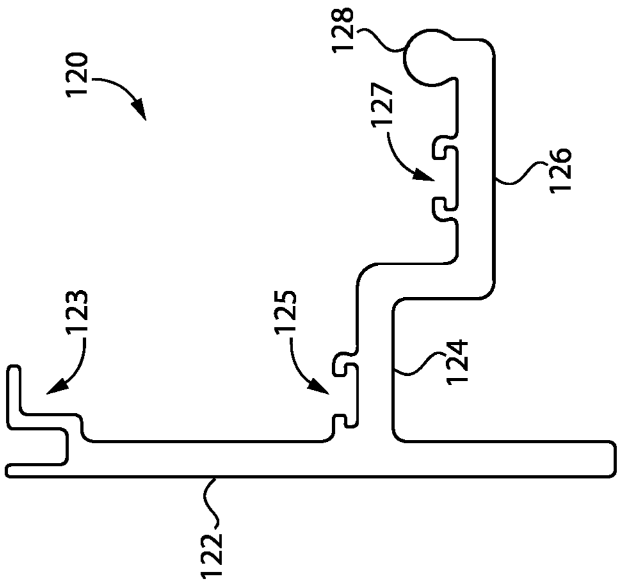
FIG. 2 is a cross-sectional illustration of a rail member of the closure assembly.
Figure 26:
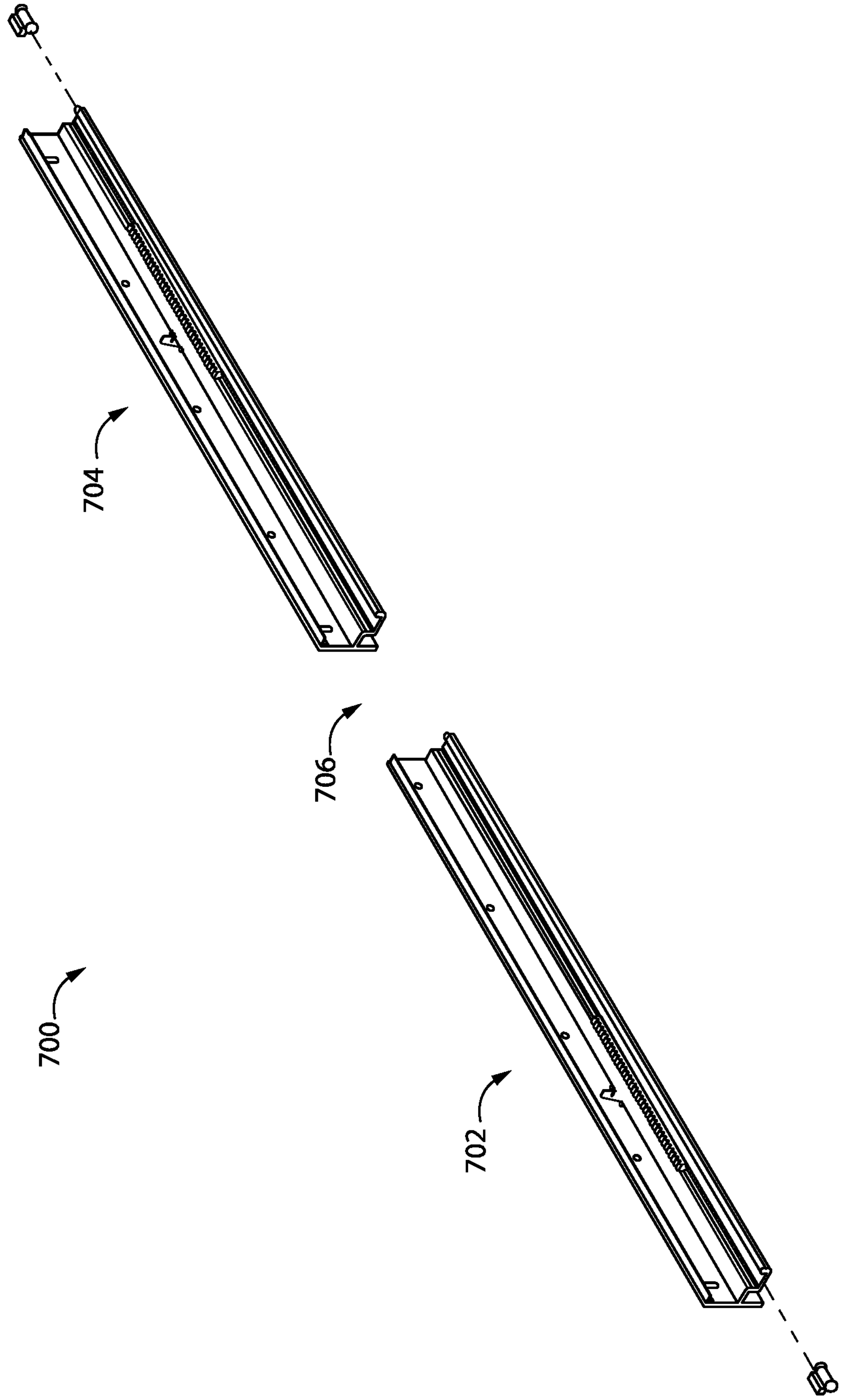
FIG. 26 illustrates a rail according to certain embodiments, the rail including a gap.

With additional reference to FIG. 2, the rail member 120 includes a vertical plate 122 by which the rail member 120 is secured to the wall 90 by a plurality of fasteners 102 such as screws, a first or upper horizontal support 124 extending laterally from the vertical plate 122, and a second or lower horizontal support 126 positioned below and to the side of the first horizontal support 124. Formed near the top of the vertical plate 122 is a flange 123, which may, in certain embodiments, support a rack member 114. The first support 124 includes a first mounting feature 125, and the second support 126 includes a second mounting feature 127 and a longitudinally-extending rail 128. In the illustrated embodiment, the rail 128 is a single continuous rail that extends the length of the rail member 120. In other embodiments, the rail 128 may be provided as two or more separate rail sections separated by one or more gaps. For example, FIG. 26 illustrates a rail 700 including a first rail section 702 and a second rail section 704 that are separated from one another such that a gap 706 is defined therebetween.

Figure 3:
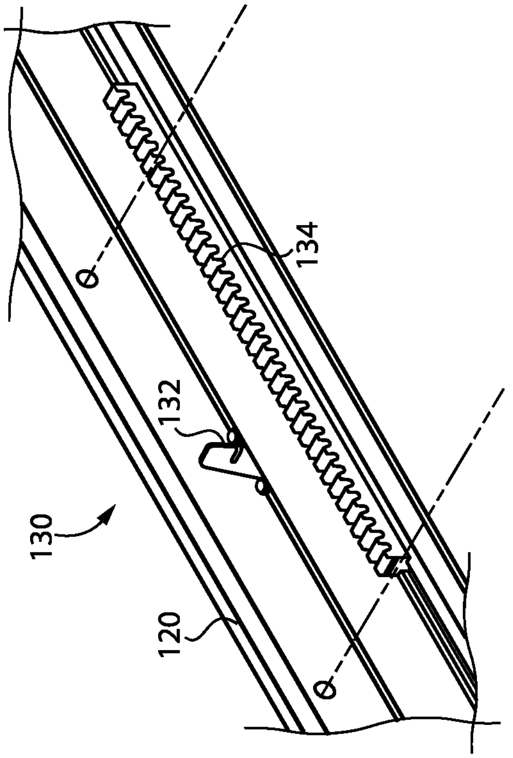
FIG. 3 is a perspective view of a portion of a rail assembly of the closure assembly.

With additional reference to FIG. 3, the closing-side engagement zone 130 includes a closing-side trigger 132 and a closing-side rack 134, each of which is fixed to the rail member 120 in the first end portion 111 of the rail assembly 110, for example above the opening 92. The trigger 132 may be mounted to the first support 124 via the first mounting feature 125, and the rack gear 134 may be mounted to the second support 126 via the second mounting feature 127. As described herein, the rack gear 134 is configured to interface with a rotary damper 176 of the door assembly 150, and may alternatively be referred to as the closing-side damper rack 134.

In the illustrated form, the opening-side engagement zone 140 includes an opening-side trigger 142 and an opening-side rack gear 144, each of which is fixed to the rail member 120 in second end portion 112 of the rail assembly 110. The trigger 142 may be mounted to the first support 124 via the first mounting feature 125, and the rack gear 144 may be mounted to the second support 126 via the second mounting feature 127. As described herein, the rack gear 144 is configured to interface with a rotary damper 186 of the door assembly 150, and may alternatively be referred to as the opening-side damper rack 144.

Figure 4:
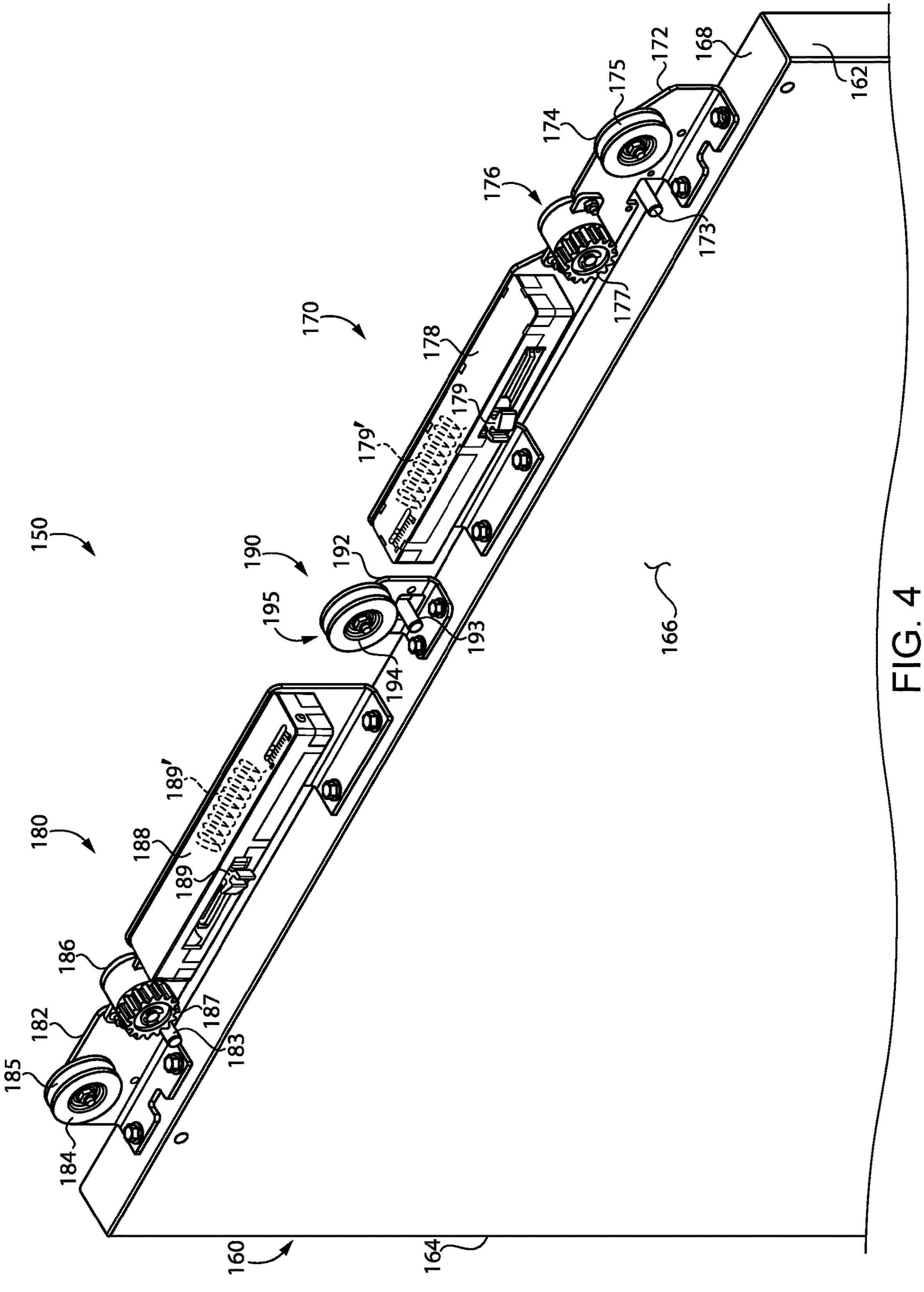
FIG. 4 is a perspective view of a portion of the closure assembly.

With additional reference to FIG. 4, the illustrated door assembly 150 generally includes a door panel 160, a closing-side module 170, and an opening-side module 180, and may further include a central module 190. The door panel 160 includes a closing-side vertical edge 162, an opening-side vertical edge 164, a broad vertical face 166, and a horizontal top edge 168 extending connected to the edges 162, 164 and the broad face 166. In the illustrated form, each of the closing-side module 170 and the opening-side module 180 is mounted to the top edge 168. In other forms, one or both of the modules 170, 180 may be mounted to the broad face 166.

Figure 5:
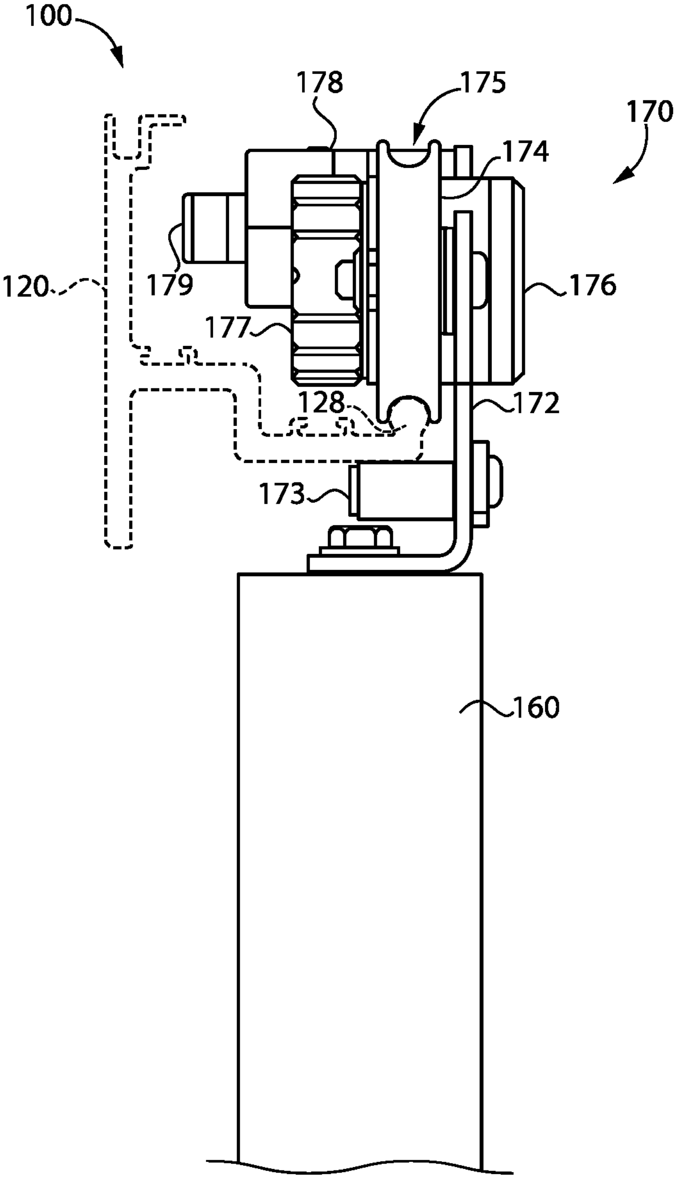
FIG. 5 is a cross-sectional illustration of a portion of the closure assembly.

With additional reference to FIG. 5, the closing-side module 170 generally includes a bracket or frame 172, an anti jump lug 173 projecting from the frame 172, a wheel 174 rotatably mounted to the frame 172, a rotary damper 176 mounted to the frame 172, and a movement assistance mechanism 178 mounted to the frame 172. The wheel 174 includes a groove 175 in which the rail 128 is seated such that the rail member 120 supports the closing-side module 170 and the door panel 160 to which the module 170 is mounted. The anti jump lug 173 is positioned below the rail 128, and hinders the module 170 from lifting off of the rail 128.

The rotary damper 176 includes a pinion gear 177 operable to engage the closing-side rack 134 such that movement of the door panel 160 to and from its fully closed position causes the rack 134 to rotate the pinion 177 in opposite directions. The rotary damper 176 is configured to resist rotation of the pinion 177 in the direction corresponding to the closing direction of the door assembly 150 such that movement of the door panel 160 to its fully closed position is resisted by the rotary damper 176. In certain forms, the rotary damper 176 is provided as a one-way rotary damper 176 that resists rotation of the pinion 177 in the rotational direction corresponding to closing movement of the door assembly 150, but does not resist rotation of the pinion 177 in the rotational direction corresponding to opening movement of the door assembly 150. In such forms, movement of the door panel 160 from its fully closed position in the opening direction is not resisted by the rotary damper 176.

The movement assistance mechanism 178 includes a latch 179 operable to engage the closing-side trigger 132 as the door panel 160 approaches its fully closed position. As described in further detail below, the latch 179 has a cocked position in which the latch 179 retains a spring 179' of the movement assistance mechanism 178 in a deformed state in which mechanical energy is stored in the spring 179'. As the door assembly 150 approaches the fully closed position, the closing-side trigger 132 engages the latch 179 and drives the latch 179 from the cocked position to a release position, thereby causing the spring 179' to release its mechanical energy and draw the door panel 160 toward its fully closed position. Further details regarding exemplary forms of the movement assistance mechanism 178 are provided below with reference to the movement assistance mechanism 200 and the force-multiplying movement assistance mechanism 300.

While other forms are contemplated, in the illustrated embodiment, the opening-side module 180 is essentially a mirror image of the closing-side module 180. Thus, the opening-side module 180 generally includes a bracket or frame 182, an anti jump lug 183 projecting from the frame 182, a wheel 184 rotatably mounted to the frame 182, a rotary damper 186 mounted to the frame 182, and a movement assistance mechanism 188 mounted to the frame 182. The wheel 184 includes a groove 185 in which the rail 128 is seated such that the rail member 120 supports the opening-side module 180 and the door panel 160 to which the module 180 is mounted. The anti jump lug 183 is positioned below the rail 128, and hinders the module 180 from lifting off of the rail 128.

The rotary damper 186 includes a pinion gear 187 operable to engage the opening-side rack 144 such that movement of the door assembly 150 to and from its fully open position causes the rack 144 to rotate the pinion 187 in opposite directions. The rotary damper 186 is configured to resist rotation of the pinion 187 in the direction corresponding to the opening direction of the door assembly 150 such that movement of the door panel 160 to its fully open position is resisted by the rotary damper 186. In certain forms, the rotary damper 186 is provided as a one-way rotary damper 186 that resists rotation of the pinion 187 in the rotational direction corresponding to open movement of the door assembly 150, but does not resist rotation of the pinion 187 in the rotational direction corresponding to closing movement of the door assembly 150. In such forms, movement of the door panel 160 from its fully open position in the closing direction is not resisted by the rotary damper 180.

The movement assistance mechanism 188 includes a latch 189 operable to engage the opening-side trigger 142 as the door assembly 150 approaches its fully open position. As described in further detail below, the latch 189 has a cocked position in which the latch 189 retains a spring 189' of the movement assistance mechanism 188 in a deformed state, in which mechanical energy is stored in the spring 189'. As the door assembly 150 approaches the fully open position, the opening-side trigger 142 engages the latch 189 and drives the latch 189 from the cocked position to a release position, thereby causing the spring 189' to release its mechanical energy and draw the door panel 160 toward its fully open position. Further details regarding exemplary forms of the movement assistance mechanism 188 are provided below with reference to the movement assistance mechanism 200 and the force-multiplying movement assistance mechanism 300.

The center module 190 generally includes a frame 192, an anti jump lug 193 projecting from the frame 192, and a wheel 194 rotatably mounted to the frame 192. The wheel 194 includes a groove 195 in which the rail 128 is seated such that the rail member 120 supports the center module 190 and the door 160 to which the module 190 is mounted. The anti jump lug 193 is positioned below the rail 128, and hinders the module 190 from lifting off of the rail 128.

Figure 6:
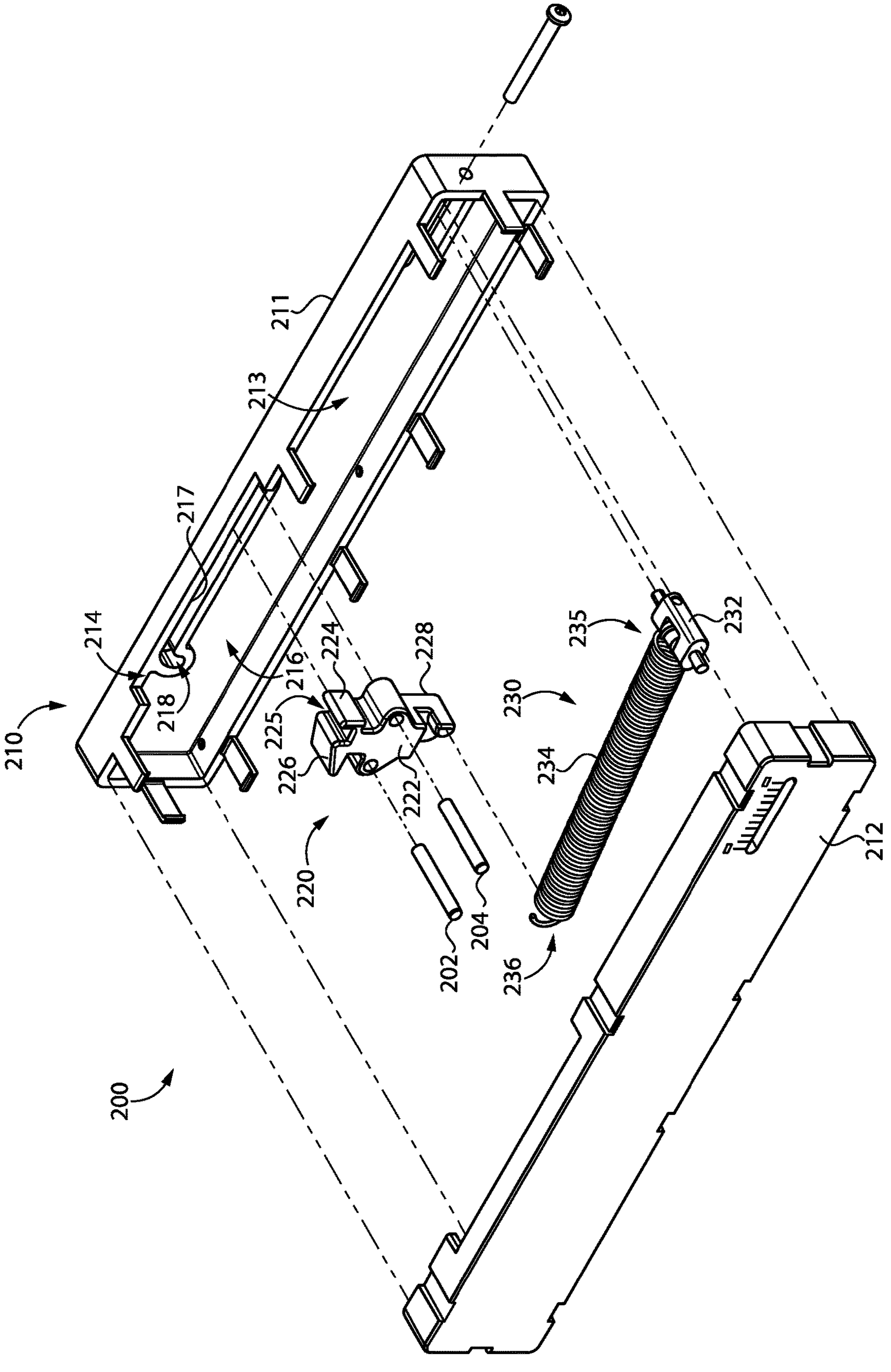
FIG. 6 is an exploded assembly view of a movement assistance mechanism according to certain embodiments.

With additional reference to FIG. 6, illustrated therein is a movement assistance mechanism 200 according to certain embodiments. The movement assistance mechanism 200 may, for example, be utilized as the closing-side movement assistance mechanism 178 and/or the opening-side movement assistance mechanism 188. The movement assistance mechanism 200 generally includes a housing 210, a latch mechanism 220 movably mounted to the housing 210, and a biasing mechanism 230 connected between the housing 210 and the latch mechanism 220.

The housing 210 includes a first portion 211 and a second portion 212 that are coupled to one another to define an internal chamber 213 in which the biasing mechanism 230 is mounted, and a channel 214 through which the latch mechanism 220 projects. The first portion 211 also defines a track 216 having a straight portion 217 and an angled jog 218, and the second portion 212 defines a mirror image track facing the track 216.

The latch mechanism 220 includes a body portion 222, first and second arms 224, 226 projecting from a first side of the body portion 222 and defining a recess 225 therebetween, and a finger 228 projecting from an opposite second side of the body portion 222. The latch mechanism 220 is slidably mounted to the housing 210 by a first pivot pin 202 and a second pivot pin 204, each of which projects into the tracks 216 such that the housing 210 movably supports the latch mechanism 220 and guides the latch mechanism 220 along the path defined by the tracks 216.

The biasing mechanism 230 includes a base 232 and a spring 234 having a first end 235 and an opposite second end 236. The first end 235 is coupled to the base 232, which is pivotably mounted to the housing 210. The second end 236 is coupled to the finger 228 such that the spring 234 biases the latch mechanism 220 toward a home position.

The latch mechanism 220 is biased toward a home position by the biasing mechanism 230, and is movable to a cocked position in which the biasing mechanism 230 is loaded such that mechanical energy is stored in the spring 234. With the latch mechanism 220 in the home position, each of the pivot pins 202, 204 is received in the straight portion 217 of the track 216. Movement of the latch mechanism 220 toward the cocked position stretches the spring 234, thereby loading the biasing mechanism 230 and storing mechanical energy in the spring 234. With the latch mechanism 220 in the cocked position, the first pivot pin 202 is received in the angled jog 218. The jog 218 retains the latch mechanism 220 in the cocked position against the biasing force of the spring 234, which urges the latch mechanism 220 toward its home position.

As noted above, the movement assistance mechanism 200 may be utilized as the closing assistance mechanism 178 of the closing-side module 170. In such forms, the movement assistance mechanism 200 cooperates with the closing-side engagement zone 130 to assist movement of the door assembly 150 toward its fully closed position. When the door assembly 150 is in its fully closed position, the latch mechanism 220 is in its home position, and the closing-side trigger 132 is received in the recess 225. As the door assembly 150 moves toward its open position under the manual force of a user, the closing-side trigger 132 engages the second arm 226 and drives the latch mechanism 220 to its cocked position, thereby stretching the spring 234. During this movement, the rotary damper 176 travels along the closing-side rack 134, thereby rotating the pinion 177 in the direction corresponding to opening movement of the door assembly 150. In embodiments in which the rotary damper 176 is provided as a unidirectional or one-way damper, this rotation of the pinion 177 is not resisted by the damper 176, such that the damper 176 does not add to the force required to move the door assembly 150 from the fully closed position. As the door assembly 150 travels toward its open position, the latch mechanism 220 travels to its cocked position, at which point the trigger 132 exits the recess 225. The latch mechanism 220 is retained in the cocked position by engagement between the jog 218 and the pin 202.

When the door assembly 150 is subsequently moved toward its closed position, the closing-side trigger 132 engages the first arm 224 to pivot the latch mechanism 220 to a release position, thereby causing the pin 202 to exit the jog 218. With the pin 202 removed from the jog 218, the spring 234 drives the latch mechanism 220 toward its home position, thereby pulling the door panel 160 toward its fully closed position. As a result, the movement assistance mechanism 200 aids in the final closing movement of the door panel 160 when utilized as the closing assistance mechanism 178 of the closing-side module 170. It should be appreciated that this final closing movement is slowed by the rotary damper 176, the pinion 177 of which engages the closing-side rack 134 during the closing movement of the door assembly 150. Due to the fact that the rotary damper 176 resists rotation of the pinion in the direction corresponding to closing movement of the door assembly 150, engagement between the damper 176 and the rack 134 slows the final closing movement of the door assembly 150.

As noted above, the movement assistance mechanism 200 may additionally or alternatively be utilized as the opening assistance mechanism 188 of the opening-side module 180. Those skilled in the art will readily recognize that in such embodiments, the movement assistance mechanism 200 will cooperate with the opening-side engagement zone 140 to assist movement of the door assembly 150 toward the fully open position in a manner analogous to that described above with reference to the use of the movement assistance mechanism 200 as the closing assistance mechanism 178 of the closing-side module 170. Additionally, the final opening movement of the door assembly 150 will be slowed by engagement between the opening-side damper 186 and the opening-side rack 144 in a manner analogous to that described above with reference to the closing-side damper 176 and the closing-side rack 134.

Figure 7:
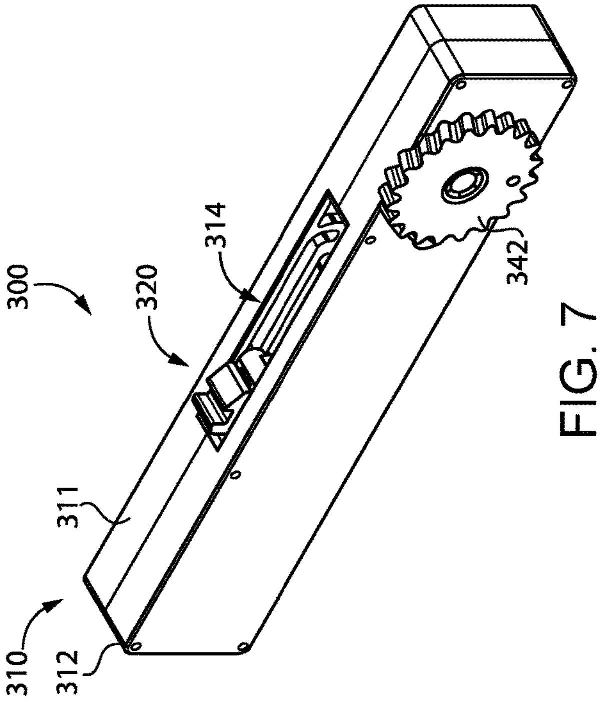
FIG. 7 is a perspective view of a movement assistance mechanism according to certain embodiments.
Figure 8:
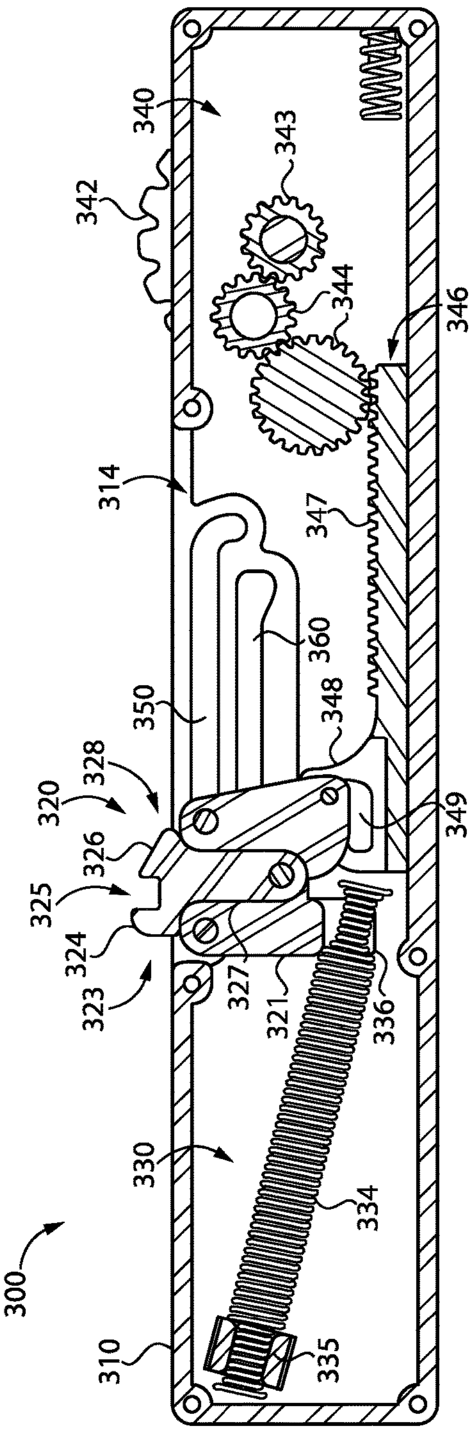
FIG. 8 is a cross-sectional view of the movement assistance mechanism of FIG. 7.
Figure 9:
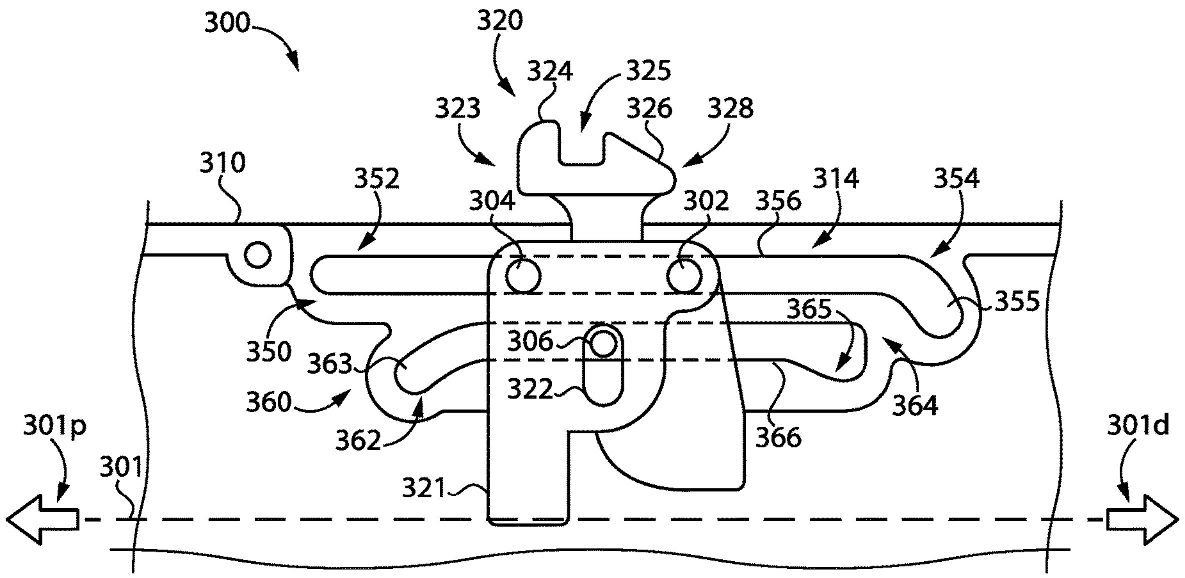
FIG. 9 is a plan view of a portion of the movement assistance mechanism illustrated in FIG. 7 with a latch mechanism in an intermediate position.

With additional reference to FIGS. 7-9, illustrated therein is a movement assistance mechanism 300 according to certain embodiments. The movement assistance mechanism 300 may, for example, be utilized as the closing-side movement assistance mechanism 178 and/or the opening-side movement assistance mechanism 188. The movement assistance mechanism 300 includes a housing 310, a latch mechanism 320 movably mounted to the housing 310, a biasing mechanism 330 connected between the housing 310 and the latch mechanism 320, and a gear train 340 connected with the latch mechanism 320.

The housing 310 includes a first portion 311 and a second portion 312 that are coupled to one another to define an internal chamber 313 in which the biasing mechanism 330 is mounted, and a longitudinal channel 314 through which a portion of the latch mechanism 320 projects. As illustrated in FIG. 9, the housing 310 defines a first track 350 and a second track 360 proximate the first track 350, further details of which are provided below. Each of the first track 350 and the second track 360 includes a first run formed in the first portion 311, and includes a mirror image second run formed in the second portion 312.

The latch mechanism 320 includes a carriage 321 movably mounted to the housing 310 and a latch body 323 movably mounted to the carriage 321. The carriage 321 includes a lateral slot 322, and is movably coupled to the housing 310 by a first pin 302 and a second pin 304. Each of the pins 302, 304 projects into the first track 350 such that the housing 310 constrains movement of the carriage 321 to the path defined by the first track 350. The latch body 323 includes a body portion 327 and a head 328 formed on one end of the body portion 327. One end of the body portion 327 is movably coupled with the carriage 321 and the housing 310 by an additional or third pin 306, which extends through the lateral slot 322. The additional or third pin 306 also extends into the second track 360 such that the housing 310 constrains movement of the latch body to the path defined by the second track 360. In the illustrated form, the pins 302, 304, 306 are separate components that are coupled to the latch mechanism 320. In other embodiments, one or more of the pins 302, 304, 306 may be formed integrally with a corresponding portion of the latch mechanism 320. The body portion 327 of the latch body 323 extends through a gap formed between the first and second pins 302, 304 to the head 328, which includes first and second arms 324, 326 having a recess 325 defined therebetween.

The biasing mechanism 330 includes a spring 334 having a first end 335 and an opposite second end 336. The first end 335 is coupled to the housing 310, and the second end 336 is coupled to the carriage 321 such that the spring 334 biases the latch mechanism 320 toward a home position (to the left in FIG. 8).

Figure 12:
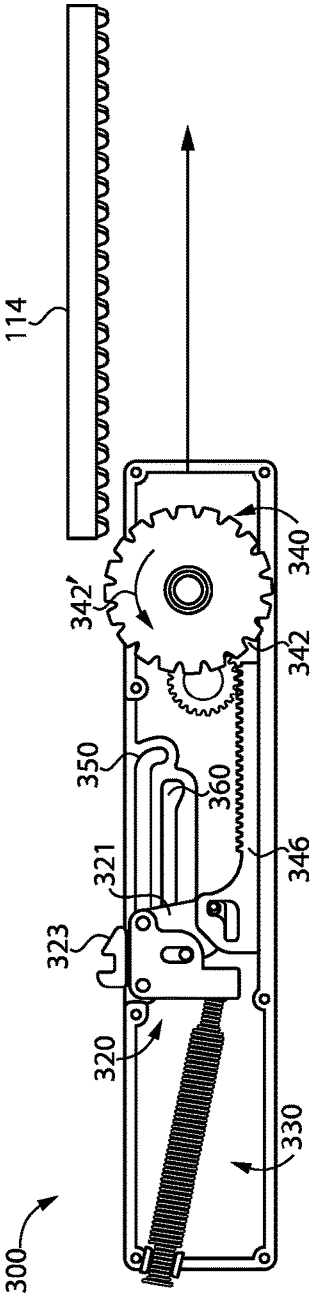
FIG. 12 illustrates the movement assistance mechanism illustrated in FIG. 7 in an unloaded state.
Figure 13:
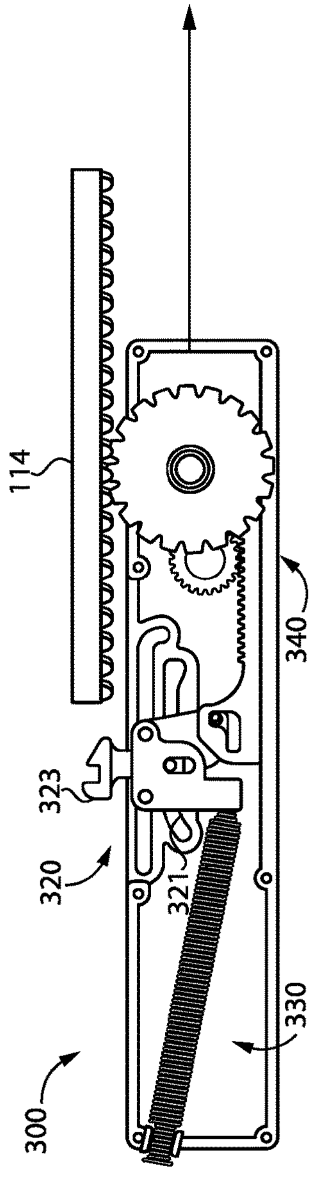
FIG. 13 illustrates the movement assistance mechanism illustrated in FIG. 7 in the process of being loaded by a rack member.
Figure 14:
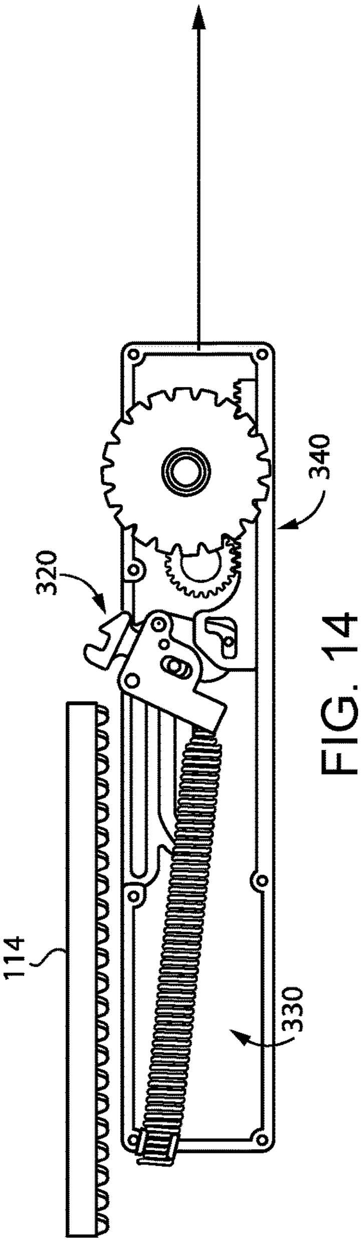
FIG. 14 illustrates the movement assistance mechanism illustrated in FIG. 7 after being loaded by the rack member.

The gear train 340 is movably mounted to the housing 310, and generally includes a pinion gear 342, an input gear 343 rotationally coupled with the pinion gear 342, one or more intermediate gears 344 operably engaged with the input gear 343, and a rack member 346 including a rack gear 347 engaged with the input gear 343 via the one or more intermediate gears 344. The pinion gear 342 is mounted to the exterior of the housing 310 such that the pinion gear 342 is operable to engage the rack gear 114 as the door assembly 150 moves between its open position and its closed position. The one or more intermediate gears 344 operably couple the rack member 346 with the input gear 343 such that rotation of the pinion gear 342 causes a corresponding longitudinal movement of the rack member 346. The rack member 346 includes an arm 348 defining an aperture 349, and a pin 306 extends through the carriage 321 and into the aperture 349, thereby operably coupling the rack member 346 with the latch mechanism 320. As a result, rotation of the pinion gear 342 in one rotational direction causes the rack member 346 to pull the latch mechanism 320 to the cocked position, thereby stretching and storing mechanical energy in the spring 334. For example, FIGS. 12-14 illustrate that rotation of the pinion gear 342 in a first rotational direction 342' distally drives the latch mechanism 320 from the home position FIG. 12) toward the cocked position (FIG. 14) as described herein.

The first track 350 includes a proximal end portion 352, an opposite distal end portion 354, and an intermediate portion 356 extending between and connecting the proximal end portion 352 and the distal end portion 354. Each of the proximal end portion 352 and the intermediate portion 356 extends substantially parallel to a longitudinal axis 301 of the movement assistance mechanism 300, and the distal end portion 354 defines an angled jog 355 that extends laterally inward (i.e., away from the channel 314). The longitudinal axis 301 extends along and defines a proximal direction 301*p* and an opposite distal direction 301*d*.

The second track 360 includes a proximal end portion 362, an opposite distal end portion 364, and an intermediate portion 366 extending between and connecting the proximal end portion 362 and the distal end portion 364. The intermediate portion 366 extends substantially parallel to the longitudinal axis 301, the proximal end portion 362 defines a second angled jog 363 extending away from the channel 314, and the distal end portion 364 defines a recess 365 extending away from the channel 314.

FIG. 9 illustrates the latch mechanism 320 in an intermediate position between the cocked position and the home position. In the intermediate position, each of the first pin 302 and the second pin 304 is received in the intermediate portion 356 of the first track 350, such that the carriage 321 is substantially straight relative to the housing 310. Additionally, the third pin 306 is received in the intermediate portion 366 of the second track 360 such that the latch body 323 has an extended position relative to the carriage 321. From the intermediate position, the latch mechanism 320 is operable to move proximally toward the home position (FIG. 10) or distally toward the cocked position (FIG. 11).

Figure 10:
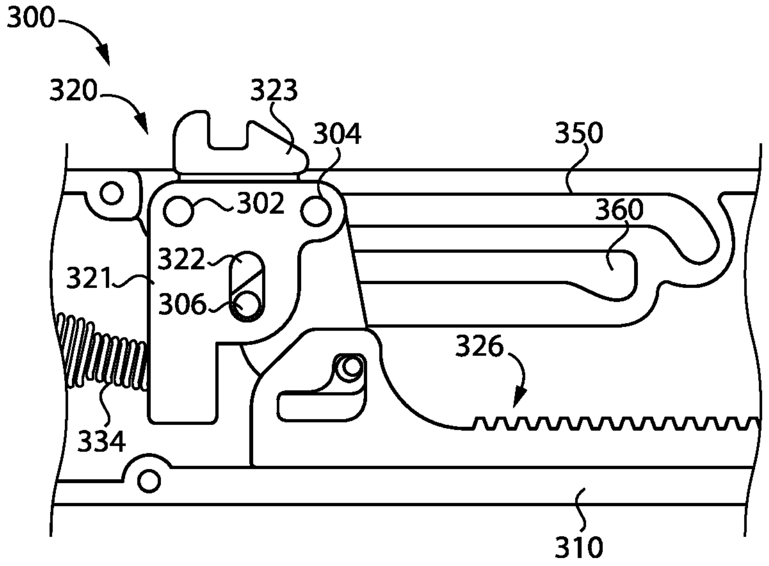
FIG. 10 is a plan view of a portion of the movement assistance mechanism illustrated in FIG. 7 with the latch mechanism in a home position.

With additional reference to FIG. 10, proximal movement of the latch mechanism 320 from the intermediate position (FIG. 9) to the home position (FIG. 10) causes the third pin 306 to travel into the jog 363 defined by the proximal end portion 362 of the second track 360. The jog 363 urges the pin 306 laterally inward, thereby moving the latch body 323 to a retracted position relative to the carriage 321.

Figure 11:
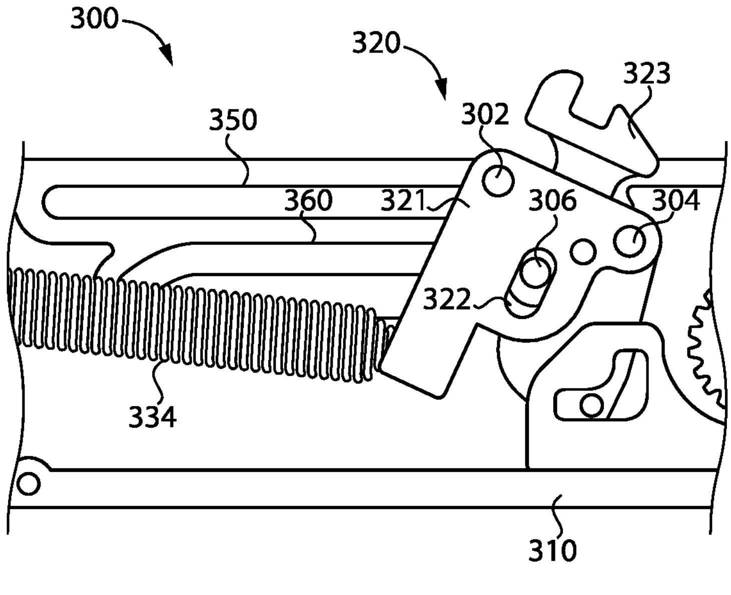
FIG. 11 is a plan view of a portion of the movement assistance mechanism illustrated in FIG. 7 with the latch mechanism in a cocked position.

With additional reference to FIG. 11, distal movement of the latch mechanism 320 from the intermediate position (FIG. 9) to the cocked position (FIG. 11) causes the first pin 302 to enter the angled jog 355 defined by the distal end portion 354 of the first track 350, thereby angling the latch mechanism 320 relative to the housing 310. In this state, the jog 355 and/or the recess 365 retains the latch mechanism 320 in the cocked position against the biasing force exerted by the spring 334.

With additional reference to FIGS. 12-14, the movement assistance mechanism 300 is configured to interface with the rack member 114 such that movement of the movement assistance mechanism 300 along the rail assembly 110 cocks the latch mechanism 320, thereby loading the movement assistance mechanism 300. The loading process begins with the movement assistance mechanism 300 in an unloaded state (FIG. 12), in which the latch mechanism 320 is in its home position. As the door panel 160 travels alongside the rail-mounted rack member 114, the rack member 114 engages the pinion 342 and begins to load the movement assistance mechanism 300 (FIG. 13). More particularly, the rail-mounted rack member 114 causes the pinion 342 to rotate the intermediate gears 344, thereby linearly driving the rack member 346 in the distal direction. As a result, the rack member 346 pulls the latch mechanism 320 to the intermediate position (FIG. 13), thereby stretching the spring 334 and storing mechanical energy in the biasing mechanism 330.

As the door panel 160 continues to travel alongside the rail-mounted rack member 114, the rack member 114 continues to rotate the pinion 342, thereby continuing the loading of movement assistance mechanism 300. The gear ratio of the gear train 340 may be selected such that the force exerted on the spring 334 by the gear train 340 is greater than the force exerted by the user as the user moves the door panel 160 alongside the rack member 114, thereby reducing the force the user is required to exert to load the movement assistance mechanism 300. When the movement assistance mechanism is fully loaded (FIG. 14), the latch mechanism 320 is retained in the cocked position by the jog 355 of the first track 350.

Once fully loaded (FIG. 14), the movement assistance mechanism 300 is able to assist in moving the door assembly 150 to a desired position (e.g., the closed position or the open position). For example, in embodiments in which the movement assistance mechanism 300 is utilized as the opening assistance mechanism 188 of the opening-side module 180, the latch mechanism 320 may engage the opening-side trigger 142 as the door panel 160 approaches the open position, thereby causing the trigger 142 to enter the recess 325. The momentum of the door panel 160 causes the trigger 142 to drive the latch mechanism 320 to the release position, at which point the spring 334 releases its mechanical energy and drives the latch mechanism 320 toward its home position, thereby drawing the door panel 160 to the desired open position. As the latch mechanism 320 approaches its home position, the jog 363 of the second track 360 engages the third pin 306, thereby driving the latch body 323 to its retracted position and causing the trigger 142 to exit the recess 325.

When the door assembly 150 is subsequently urged from the open position toward the closed position, the trigger 142 passes alongside the retracted latch body 323. As a result, the user need not return the latch mechanism 320 to its cocked position against the force of the spring 334. Instead, such return is accomplished by the above-described engagement between the gear train 340 and the rack 114. As noted above, the gear ratio of the gear train 340 may be selected such that the force applied to the latch mechanism 320 during such loading is greater than the force applied to the door panel 160 to effect such loading. As a result, the force the user is required to exert in order to load the movement assistance mechanism 300 is reduced.

As noted above, the movement assistance mechanism 300 may additionally or alternatively be utilized as the closing assistance mechanism 178 of the closing-side module 170. Those skilled in the art will readily appreciate that a sequence of events analogous to that described above will occur when the movement assistance mechanism 300 is utilized as the closing assistance mechanism 178 of the closing-side module 170.

In certain embodiments, the above-described loading of the movement assistance mechanism 300 may occur as the door assembly 150 moves toward its desired position, while in other embodiments, the loading of the movement assistance mechanism 300 may occur as the door assembly 150 moves away from its desired position.

Figure 15:
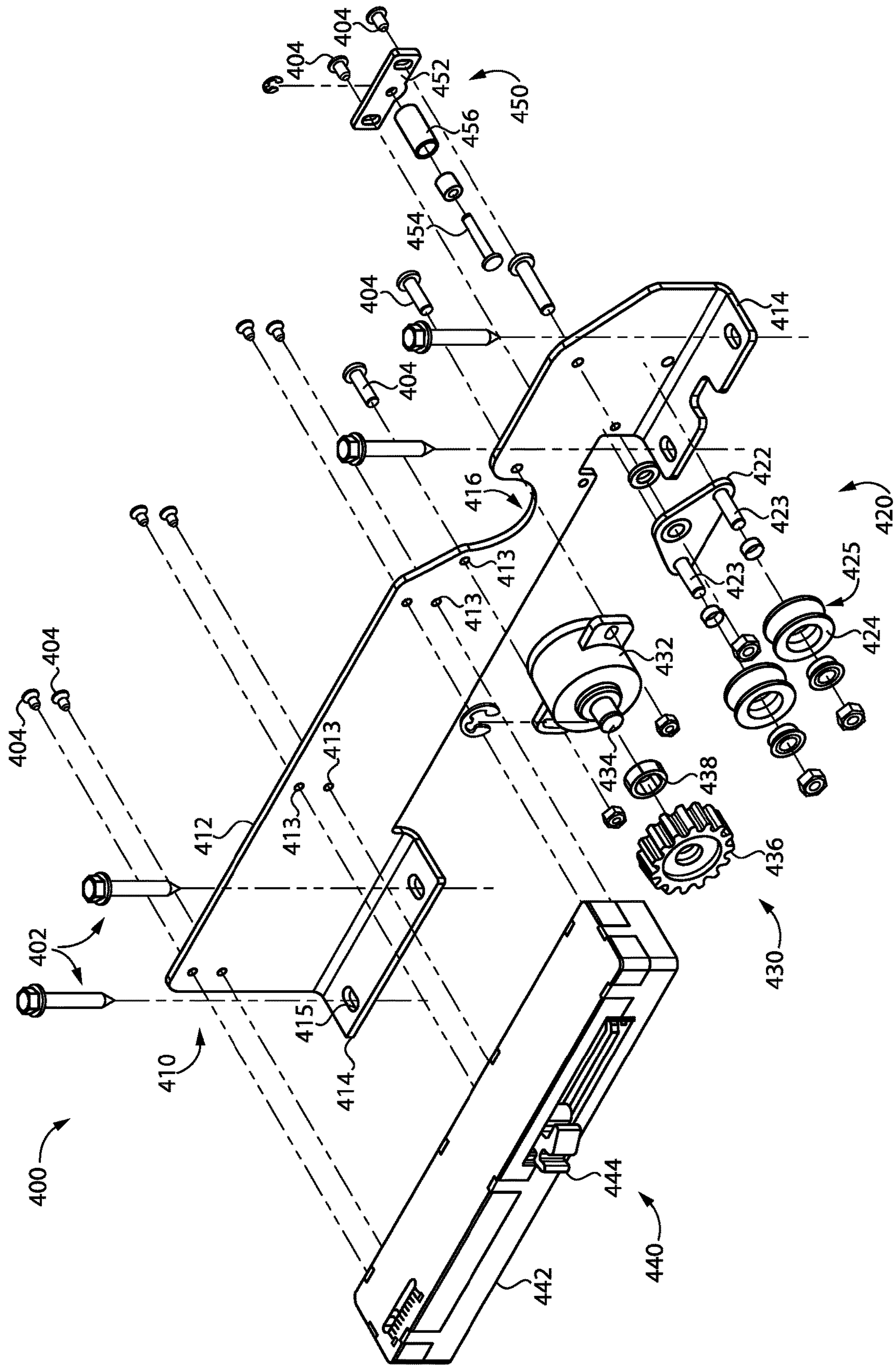
FIG. 15 is an exploded assembly view of a door module or door assembly according to certain embodiments.

With additional reference to FIG. 15, illustrated therein is an assembly or module 400 according to certain embodiments. The module 400 may, for example, be utilized as the closing-side module 170 of the closure assembly 100, and certain descriptions of the module 400 may be made with specific reference to such an implementation. It is to be appreciated, however, that analogous features and characteristics may be present when a module along the lines of the module 400 is utilized as the opening-side module 180 of the closure assembly 100. In the illustrated form, the module 400 generally includes a bracket 410 configured for mounting to the door panel 160. The illustrated module 400 further includes a wheel mechanism 420, a rotary damper 430, a movement assistance mechanism 440, and an anti jump lug 450, each of which is mounted to the bracket 410.

The bracket 410 includes a vertical base plate 412 and a pair of horizontal flanges 414 projecting from opposite ends of the base plate 412. Each flange 414 includes one or more fastener openings 415 for receiving fasteners 402 by which the bracket 410 is secured to the door panel 160. The base plate 412 includes a recess 416 in which a portion of the rotary damper 430 is seated. The base plate 412 also includes a plurality of mounting apertures 413 through which fasteners 404 extend to secure various components of the module 400 to the bracket 410.

The illustrated wheel mechanism 420 includes a pivot plate 422 that is pivotably mounted to the bracket 410, and which includes a pair of posts 423 projecting therefrom. Rotatably mounted on the posts 423 are a pair of wheels 424, each of which includes a circumferential groove 425 operable to receive the rail 128.

The rotary damper 430 includes a body 432 having a rotatable shaft 434 projecting therefrom. As is known in the art, the body 432 is filled with a fluid that resists rotation of the shaft 434. A pinion 436 is coupled to the shaft 434 via a one-way bearing 438 that couples the pinion 436 and the shaft 434 for joint rotation in one rotational direction, while permitting the pinion 436 to rotate relative to the shaft 434 in the opposite rotational direction. The pinion 436 is configured to engage the closing-side rack 134 such that the pinion 436 rotates in the first direction as the door assembly 150 approaches the closed position, and rotates in the opposite direction during opening of the door assembly 150. As a result, the rotary damper 430 slows movement of the door panel 160 as the door assembly 150 approaches the closed position (e.g., under the urging of the movement assistance mechanism 440), and does not resist opening movement of the door assembly 150.

The movement assistance mechanism 440 includes a housing 442 and a latch mechanism 444 movably mounted to the housing 442, and is configured to assist in the final closing movement of the door assembly 150. In the illustrated embodiment, the movement assistance mechanism 440 is provided in the form of the above-described movement assistance mechanism 200. In other embodiments, the movement assistance mechanism 440 may be provided in another form, such as that of the force-multiplying movement assistance mechanism 300. The movement assistance mechanisms 200, 300 are configured to assist in moving the door assembly 150 to a desired position in the manners described above, which need not be repeated herein.

The anti jump lug 450 includes a mount plate 452 secured to the bracket 410, a post 454 projecting from the mount plate 452, and a sleeve 456 mounted to the post 454 via a bushing 458 such that the sleeve 456 is rotatable relative to the post 454. In a manner similar to that described above with reference to the anti jump lug 173, the anti jump lug 450 is positioned below the wheels 424 such that the rail 128 is received between the anti jump lug 450 and the wheels 424, thereby discouraging the module 400 from jumping off the rail 128.

Figure 16:
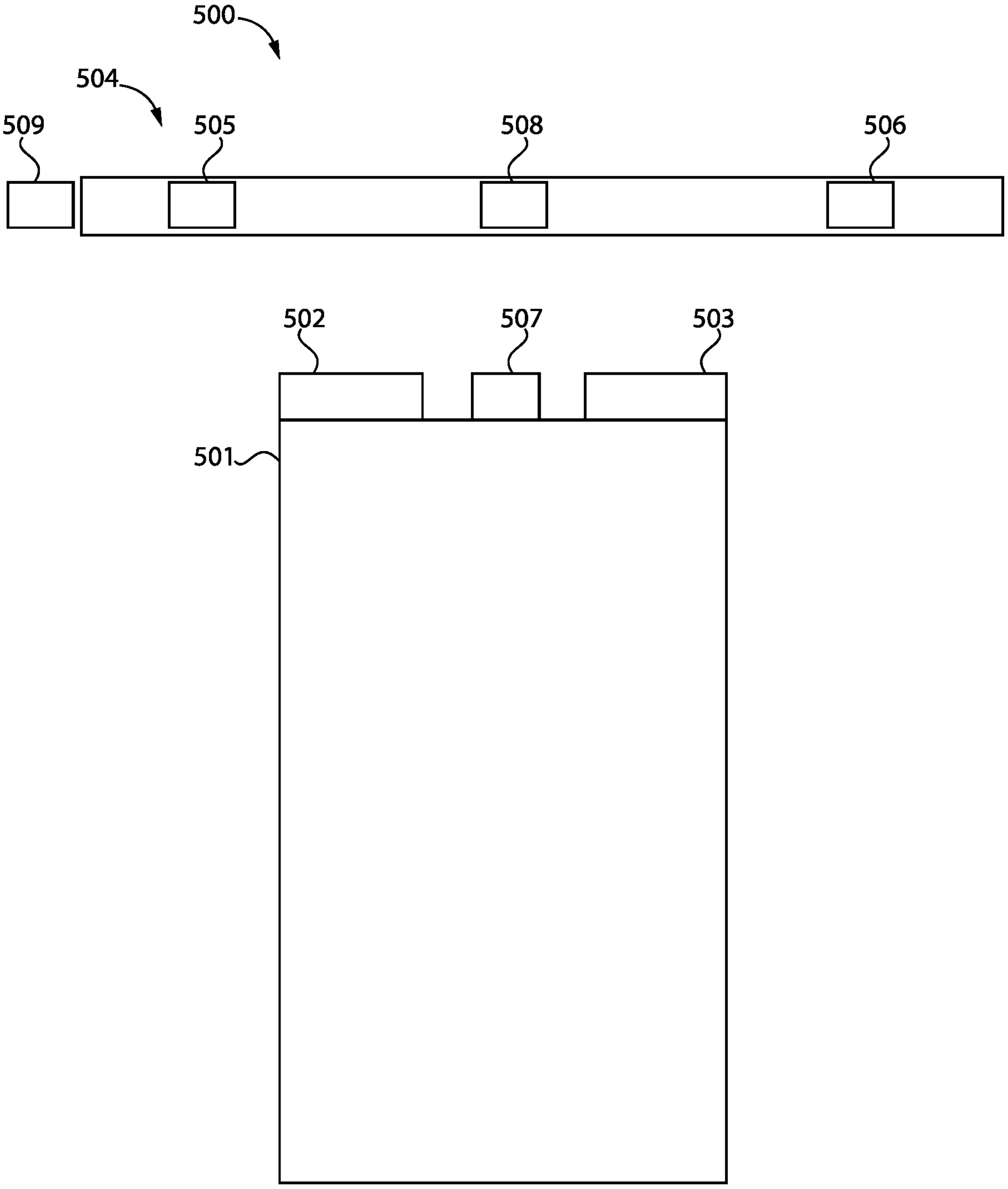
FIG. 16 is a schematic representation of a closure assembly according to certain embodiments.

With additional reference to FIG. 16, illustrated therein is a schematic representation of a closure assembly 500 according to certain embodiments. The closure assembly 500 includes a door panel 501 movable between a closed position (to the left in FIG. 16) and an open position (to the right in FIG. 16), a closing-side module 502, an opening side module 503, and a rail assembly 504 including at least one of a closing-side engagement zone 505 or an opening-side engagement zone 506. The closure assembly 500 may further include one or more of an intermediate module 507, an additional engagement zone 508, or a biasing assembly 509 urging the door panel 501 toward the closed position.

Figure 17:
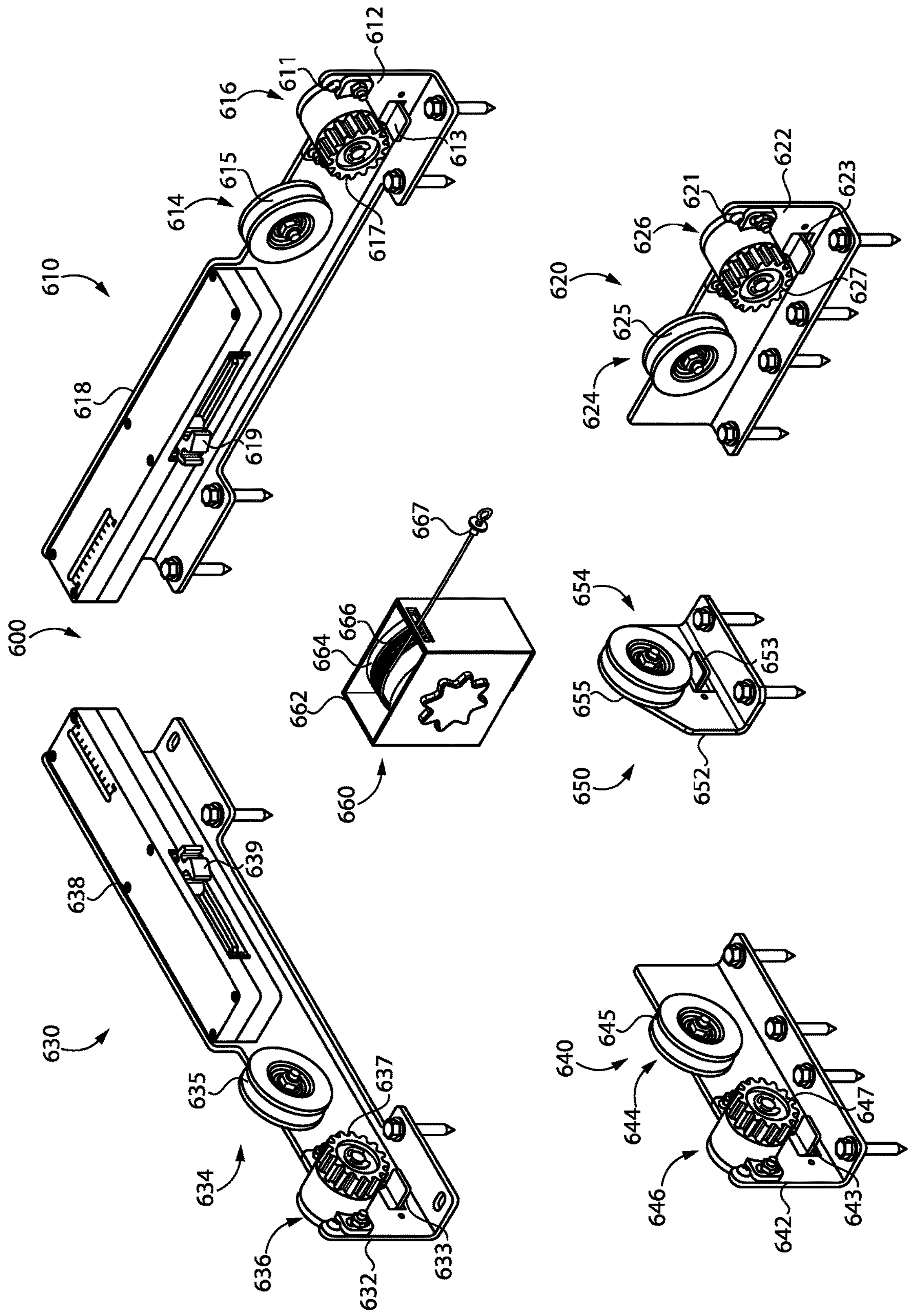
FIG. 17 illustrates a system that may be utilized to generate a closure assembly.

With additional reference to FIG. 17, illustrated therein is a system 600 according to certain embodiments. As described herein, the system 600 includes a plurality of modular components from which the closure assembly 500 can be assembled in various configurations. The system 600 generally includes an assisted closing module 610 and a dampened closing module 620, each of which is operable to be utilized as a closing-side module 502. The system 600 further includes an assisted opening module 630 and a dampened opening module 640, each of which is operable to be utilized as the opening-side module 503. The system 600 further includes a wheel module 650, which is operable to be utilized as the closing-side module 502, the opening-side module 503, and/or the central module 507. The system 600 further includes a biasing module 660 operable to be utilized as the biasing assembly 509.

The assisted closing module 610 is configured to assist in the final closing movement of the door 501, and to slow such movement of the door 501 to its final closed position. The assisted closing module 610 is substantially similar to the above-described closing-side module 170, and similar reference characters are used to indicate similar elements and features. Thus, the assisted closing module 610 includes a bracket 612 having an anti jump lug 613 projecting therefrom, a wheel 614 including a circumferential groove 615, a rotary damper 616 including a pinion 617, and a closing assistance mechanism 618 including a latch mechanism 619. The bracket 612 may include an anchor 611 operable to engage a tether of the biasing module 660. In the illustrated form, the assisted closing module 610 includes a single wheel 614. In other embodiments, the assisted closing module 610 may include a dual-wheel mechanism, for example of the type described above with reference to the wheel mechanism 420. The rotary damper 616 may be provided as a one-way damper that resists rotation of the pinion 617 in the direction corresponding to closing movement of the door 501 and does not resist rotation of the pinion 617 in the opposite direction corresponding to opening movement of the door 501. The closing assistance mechanism 618 may, for example, be provided in the form of the movement assistance mechanism 200 or that of the force-multiplying movement assistance mechanism 300.

The closing-side module 502 of the closure assembly 500 may be provided in the form of the assisted closing module 610. In such embodiments, the closing-side engagement zone 505 of closure assembly 500 may include a rack configured to engage the pinion 617 (such as the closing-side rack 134) and a trigger configured to engage the latch mechanism 619 (such as the closing-side trigger 132). In certain embodiments, the closing assistance mechanism 618 may be provided as the movement assistance mechanism 300, and the additional engagement zone 508 may include a rack configured to load the movement assistance mechanism 300 in the manner described above. In other embodiments, the closing assistance mechanism 618 may be provided as the movement assistance mechanism 200, and the additional engagement zone 508 may not necessarily include such a rack, or may be omitted.

The dampened closing module 620 includes a bracket 622 having an anti jump lug 623 projecting therefrom, a wheel 624 including a circumferential groove 625, and a rotary damper 626 including a pinion 627. The bracket 622 may include an anchor 621 operable to engage a tether of the biasing module 660. In the illustrated form, the dampened closing module 620 includes a single wheel 624. In other embodiments, the dampened closing module 620 may include a dual-wheel mechanism, for example of the type described above with reference to the wheel mechanism 420. The rotary damper 626 may be provided as a one-way damper that resists rotation of the pinion 627 in the direction corresponding to closing movement of the door 501 and does not resist rotation of the pinion 627 in the opposite direction corresponding to opening movement of the door 501.

The closing-side module 502 of the closure assembly 500 may be provided in the form of the dampened closing module 620. In such embodiments, the closing-side engagement zone 505 of closure assembly 500 may include a rack configured to engage the pinion 617 (such as the rack 134), and the trigger may be omitted from the closing-side engagement zone 505.

The assisted opening module 630 is configured to assist in the final opening movement of the door 501, and to slow such movement of the door 501 to its final open position. The assisted opening module 630 is substantially similar to the above-described opening-side module 180, and similar reference characters are used to indicate similar elements and features. Thus, the assisted opening module 630 includes a bracket 632 having an anti jump lug 633 projecting therefrom, a wheel 634 including a circumferential groove 635, a rotary damper 636 including a pinion 637, and an opening assistance mechanism 638 including a latch mechanism 639. In the illustrated form, the assisted opening module 630 includes a single wheel 634. In other embodiments, the assisted opening module 630 may include a dual-wheel mechanism, for example of the type described above with reference to the wheel mechanism 420. The rotary damper 636 may be provided as a one-way damper that resists rotation of the pinion 637 in the direction corresponding to opening movement of the door 501 and does not resist rotation of the pinion 637 in the opposite direction corresponding to closing movement of the door 501. The opening assistance mechanism 638 may, for example, be provided in the form of the movement assistance mechanism 200 or that of the movement assistance mechanism 300.

The opening-side module 503 of the closure assembly 500 may be provided in the form of the assisted opening module 630. In such embodiments, the opening-side engagement zone 506 of closure assembly 500 may include a rack configured to engage the pinion 637 (such as the rack 144) and a trigger configured to engage the latch mechanism 639 (such as the trigger 142). In certain embodiments, the opening assistance mechanism 638 may be provided as the movement assistance mechanism 300, and the additional engagement zone 508 may include a rack configured to load the movement assistance mechanism 300 in the manner described above. In other embodiments, the opening assistance mechanism 638 may be provided as the movement assistance mechanism 200, and the additional engagement zone 508 may not necessarily include such a rack, or may be omitted.

The dampened opening module 640 includes a bracket 642 having an anti jump lug 643 projecting therefrom, a wheel 644 including a circumferential groove 645, and a rotary damper 646 including a pinion 647. In the illustrated form, the dampened opening module 640 includes a single wheel 644. In other embodiments, the dampened opening module 640 may include a dual-wheel mechanism, for example of the type described above with reference to the wheel mechanism 420. The rotary damper 646 may be provided as a one-way damper that resists rotation of the pinion 647 in the direction corresponding to opening movement of the door 501 and does not resist rotation of the pinion 647 in the opposite direction corresponding to closing movement of the door 501.

The opening-side module 503 of the closure assembly 500 may be provided in the form of the dampened opening module 640. In such embodiments, the opening-side engagement zone 506 of closure assembly 500 may include a rack configured to engage the pinion 637 (such as the closing-side rack 134), and the trigger may be omitted from the opening-side engagement zone 506.

The wheel module 650 includes a bracket 652 having an anti jump lug 653 projecting therefrom, and a wheel 654 including a circumferential groove 655. In the illustrated form, the wheel module 650 includes a single wheel 654. In other embodiments, the wheel module 650 may include a dual-wheel mechanism, for example of the type described above with reference to the wheel mechanism 420.

In certain embodiments, the closing-side module 502 of the closure assembly 500 may be provided in the form of the wheel module 650, and both the trigger and the rack may be omitted from the closing-side engagement zone 505. Alternatively, the opening-side module 503 of the closure assembly 500 may be provided in the form of the wheel module 650, and both the trigger and the rack may be omitted from the opening-side engagement zone 506. In certain embodiments, the intermediate module 507 of the closure assembly 500 may be provided in the form of the wheel module 650. For example, in embodiments in which the rail assembly 504 is provided as two separate pieces having a gap formed therebetween (for example as illustrated in FIG. 26), such an intermediate module 507 may aid in maintaining the door 501 level as the closing-side wheel and/or the opening-side wheel traverse the gap.

The biasing module 660 includes a housing 662, a spool 664 rotatably mounted in the housing 662, and a tether 666 wrapped about the spool 664. A first end of the tether 666 is secured to the spool 664, and an opposite second end 667 of the tether 666 is operable to be secured to the door 501 and/or the closing-side module 502. The spool 664 is spring-biased to retract the tether 666. When included in the closure assembly 500 as the biasing assembly 509, the biasing module 660 is mounted at or near the end of the rail assembly 504 corresponding to the closed position of the door 501, and the end 667 of the tether 666 is secured to the door 501 or the closing-side module 502. When the door 501 is moved toward its open position, the tether 666 is unspooled, thereby loading the spring that biases the spool 664 to rotate. When the door 501 is released, the spring releases its stored mechanical energy by retracting the tether 666, thereby returning the door 501 toward its closed position.

With additional reference to FIGS. 18-25, illustrated therein are certain non-limiting embodiments of closure assemblies. Each of the closure assemblies is an example of the above-described closure assembly 500, and similar reference characters are used to indicate similar elements and features. While not specifically illustrated in FIGS. 18-25, it is to be appreciated that each of the closure assemblies may further include a rail assembly corresponding to the above-described rail assembly 504.

Figure 18:
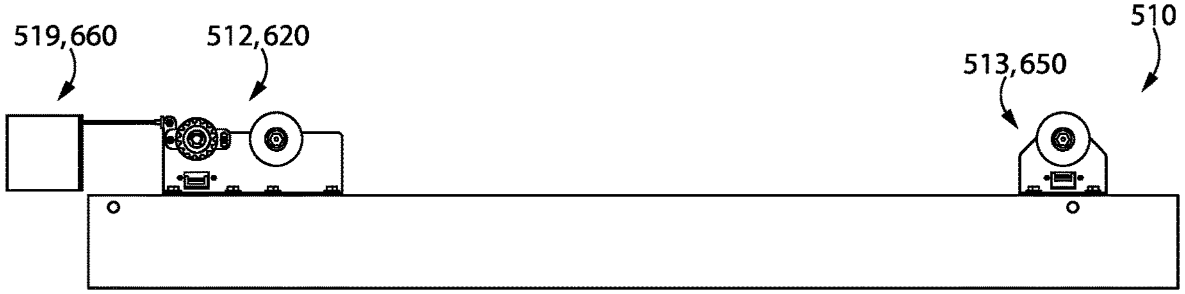
FIGS. 18-25 illustrate various embodiments of closure assemblies generated with the system illustrated in FIG. 17.

With reference to FIG. 18, illustrated therein is a closure assembly 510 according to certain embodiments. The closing-side module 512 is provided in the form of the dampened closing module 620. The closing-side engagement zone of the closure assembly 510 includes a rack configured to engage the pinion of the dampened closing module 620, and need not include a trigger. The opening-side module 513 is provided in the form of the wheel module 650. The opening-side engagement zone of the closure assembly 510 need not include a rack or a trigger, and may be omitted. The closure assembly 510 optionally includes a biasing assembly 519 such as the biasing module 660. It should be appreciated that while a single wheel is illustrated in each of the modules 512, 513, one or both of the modules 512, 513 may include a dual-wheel mechanism.

Figure 19:
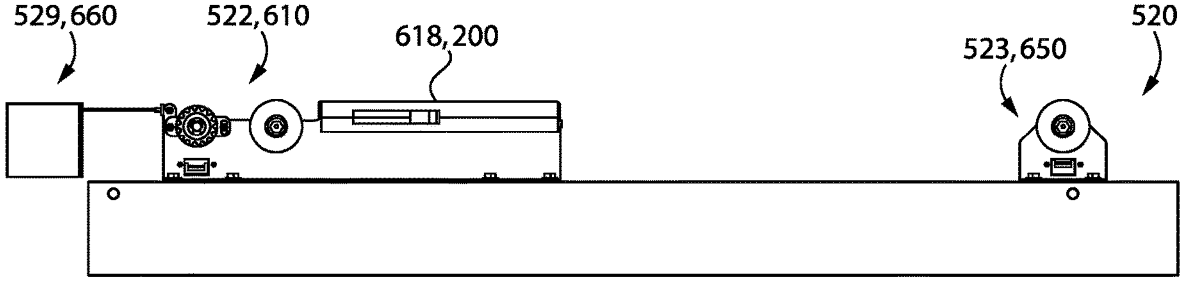

With reference to FIG. 19, illustrated therein is a closure assembly 520 according to certain embodiments. The closing-side module 522 is provided in the form of the assisted closing module 610, in which the closing assistance mechanism 618 is provided as the movement assistance mechanism 200. The closing-side engagement zone of the closure assembly 520 includes a rack configured to engage the pinion of the assisted closing module 610 and a trigger configured to engage the latch mechanism of the movement assistance mechanism 618, 200. The opening-side module 523 is provided in the form of the wheel module 650. The opening-side engagement zone of the closure assembly 520 need not include a rack or a trigger, and may be omitted. The closure assembly 520 optionally includes a biasing assembly 529 such as the biasing module 660. It should be appreciated that while a single wheel is illustrated in each of the modules 522, 523, one or both of the modules 522, 523 may include a dual-wheel mechanism.

Figure 20:
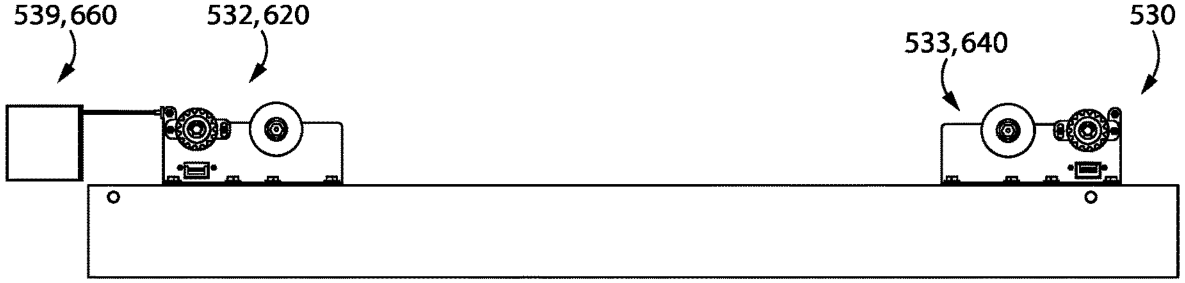

With reference to FIG. 20, illustrated therein is a closure assembly 530 according to certain embodiments. The closing-side module 532 is provided in the form of the dampened closing module 620. The closing-side engagement zone of the closure assembly 530 includes a rack configured to engage the pinion of the dampened closing module 620, and need not include a trigger. The opening-side module 533 is provided in the form of the dampened opening module 640. The opening-side engagement zone of the closure assembly 530 includes a rack configured to engage the pinion of the dampened opening module 640, and need not include a trigger. The closure assembly 530 optionally includes a biasing assembly 539 such as the biasing module 660. It should be appreciated that while a single wheel is illustrated in each of the modules 532, 533, one or both of the modules 532, 533 may include a dual-wheel mechanism.

Figure 21:
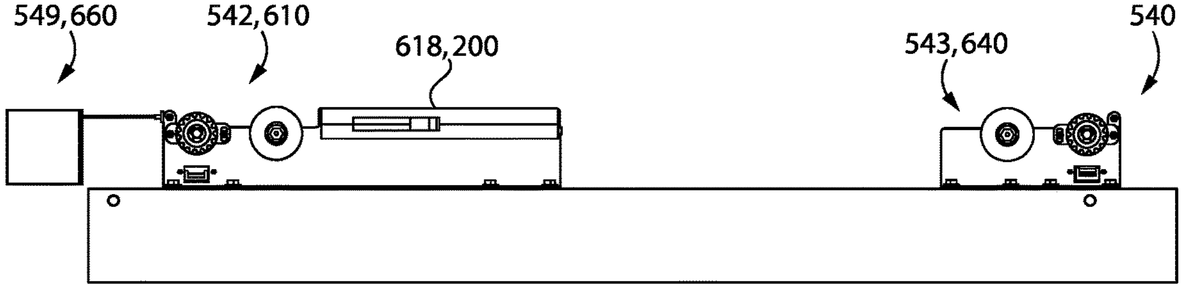

With reference to FIG. 21, illustrated therein is a closure assembly 540 according to certain embodiments. The closing-side module 542 is provided in the form of the assisted closing module 610, in which the closing assistance mechanism 618 is provided in the form of the movement assistance mechanism 200. The closing-side engagement zone of the closure assembly 540 includes a rack configured to engage the pinion of the assisted closing module 610 and a trigger configured to engage the latch mechanism of the closing assistance mechanism 618, 200. The opening-side module 543 is provided in the form of the dampened opening module 640. The opening-side engagement zone of the closure assembly 540 includes a rack configured to engage the pinion of the dampened opening module 640, and need not include a trigger. The closure assembly 540 optionally includes a biasing assembly 549 such as the biasing module 660. It should be appreciated that while a single wheel is illustrated in each of the modules 542, 543, one or both of the modules 542, 543 may include a dual-wheel mechanism.

Figure 22:
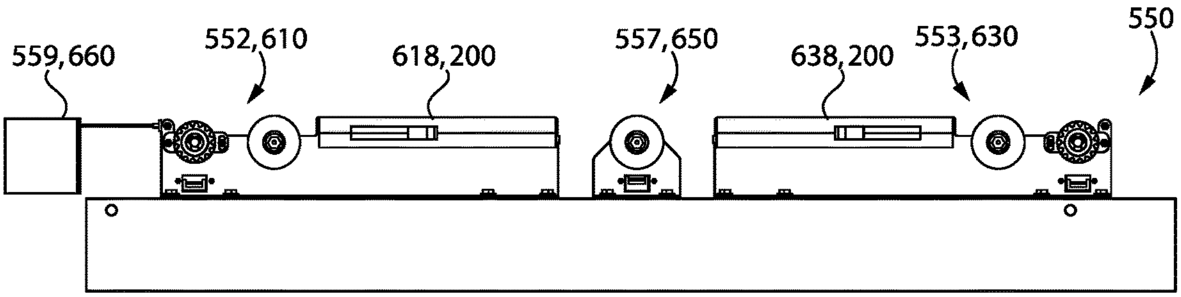

With reference to FIG. 22, illustrated therein is a closure assembly 550 according to certain embodiments. The closing-side module 552 is provided in the form of the assisted closing module 610, in which the closing assistance mechanism 618 is provided in the form of the movement assistance mechanism 200. The closing-side engagement zone of the closure assembly 550 includes a rack configured to engage the pinion of the assisted closing module 610 and a trigger configured to engage the latch mechanism of the closing assistance mechanism 618, 200. The opening-side module 553 is provided in the form of the assisted opening module 630, in which the opening assistance mechanism 638 is provided in the form of the movement assistance mechanism 200. The opening-side engagement zone of the closure assembly 550 includes a rack configured to engage the pinion of the assisted opening module 630 and a trigger configured to engage the latch mechanism of the opening assistance mechanism 638, 200. The closure assembly 550 optionally includes a center module 557 in the form of the wheel module 650. The closure assembly 550 optionally includes a biasing assembly 559 such as the biasing module 660. It should be appreciated that while a single wheel is illustrated in each of the modules 552, 553, 557, one or more of the modules 552, 553, 557 may include a dual-wheel mechanism.

Figure 23:
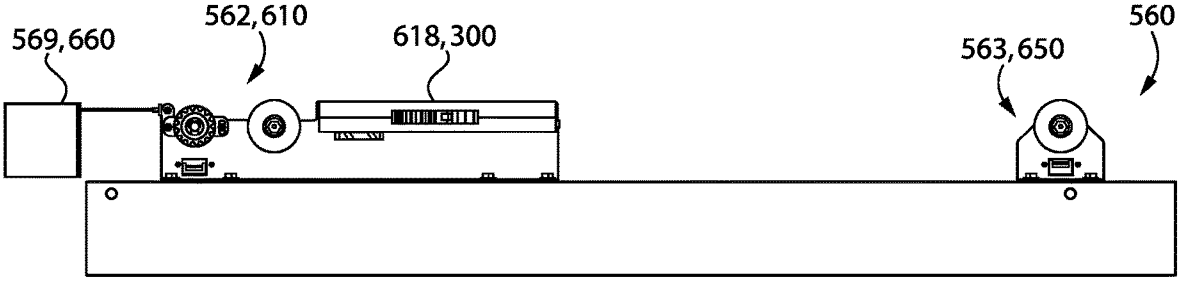

With reference to FIG. 23, illustrated therein is a closure assembly 560 according to certain embodiments. The closing-side module 562 is provided in the form of the assisted closing module 610, in which the closing assistance mechanism 618 is provided in the form of the movement assistance mechanism 300. The closing-side engagement zone of the closure assembly 560 includes a rack configured to engage the pinion of the assisted closing module 610 and a trigger configured to engage the latch mechanism of the movement assistance mechanism 618, 300. The additional engagement zone of the closure assembly 560 includes a rack configured to engage the pinion of the closing assistance mechanism 618, 300. The opening-side module 563 is provided in the form of the wheel module 650. The opening-side engagement zone of the closure assembly 560 need not include a rack or a trigger, and may be omitted. The closure assembly 560 optionally includes a biasing assembly 569 such as the biasing module 660. It should be appreciated that while a single wheel is illustrated in each of the modules 562, 563, one or both of the modules 562, 563 may include a dual-wheel mechanism.

Figure 24:
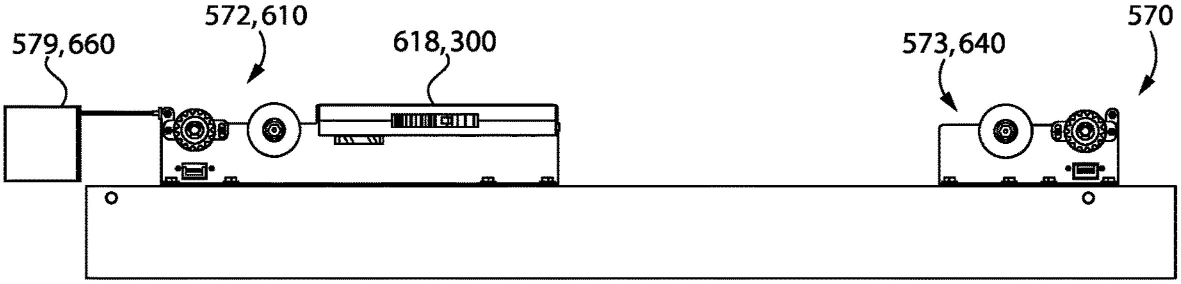

With reference to FIG. 24, illustrated therein is a closure assembly 570 according to certain embodiments. The closing-side module 572 is provided in the form of the assisted closing module 610, in which the closing assistance mechanism 618 is provided in the form of the movement assistance mechanism 300. The closing-side engagement zone of the closure assembly 570 includes a rack configured to engage the pinion of the assisted closing module 610 and a trigger configured to engage the latch mechanism of the closing assistance mechanism 618, 300. The additional engagement zone of the closure assembly 560 includes a rack configured to engage the pinion of the closing assistance mechanism 618, 300. The opening-side module 573 is provided in the form of the dampened opening module 640. The opening-side engagement zone of the closure assembly 570 includes a rack configured to engage the pinion of the dampened opening module 640, and need not include a trigger. The closure assembly 570 optionally includes a biasing assembly 579 such as the biasing module 660. It should be appreciated that while a single wheel is illustrated in each of the modules 572, 573, one or both of the modules 572, 573 may include a dual-wheel mechanism.

Figure 25:
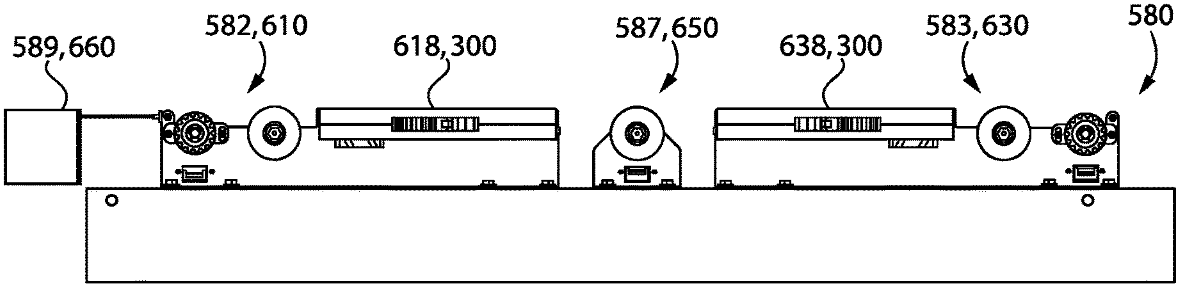

With reference to FIG. 25, illustrated therein is a closure assembly 580 according to certain embodiments. The closing-side module 582 is provided in the form of the assisted closing module 610, in which the closing assistance mechanism 618 is provided in the form of the movement assistance mechanism 300. The closing-side engagement zone of the closure assembly 580 includes a rack configured to engage the pinion of the assisted closing module 610 and a trigger configured to engage the latch mechanism of the closing assistance mechanism 618, 300. The opening-side module 583 is provided in the form of the assisted opening module 630, in which the opening assistance mechanism 638 is provided in the form of the movement assistance mechanism 300. The opening-side engagement zone of the closure assembly 580 includes a rack configured to engage the pinion of the assisted opening module 630 and a trigger configured to engage the latch mechanism of the opening assistance mechanism 638, 300. The additional engagement zone of the closure assembly 560 may include a rack configured to engage the pinions of each of the closing assistance mechanism 618, 300 and the opening assistance mechanism 638, 300. Alternatively, the additional engagement zone of the closure assembly 560 may include a first rack configured to engage the pinion of the closing assistance mechanism 618, 300 and a second rack configured to engage the pinion of the opening assistance mechanism 638, 300. The closure assembly 580 optionally includes a center module 587 in the form of the wheel module 650. The closure assembly 580 optionally includes a biasing assembly 589 such as the biasing module 660. It should be appreciated that while a single wheel is illustrated in each of the modules 582, 583, 587, one or more of the modules 582, 583, 587 may include a dual-wheel mechanism.

As should be evident from the foregoing, the modular system 600 is capable of being used to create closure assemblies having varying configurations, such as those described above with reference to FIGS. 18-25.

While certain exemplary forms of closure assemblies and modules have been described herein, it is to be appreciated that various modifications of the described subject matter are also considered within the scope of the subject matter set forth herein. For example, while the embodiments set forth herein generally describe a first member mounted to the door and a cooperating second member mounted to the rail assembly, it is also contemplated that these positions may be reversed. Thus, while the embodiments set forth hereinabove generally involve providing a rotary damper to the door and a cooperating rack to the rail assembly, it should be appreciated that the rotary damper may instead be mounted to the rail assembly, and that the cooperating rack member may be mounted to the door. Similarly, while certain embodiments involve a movement assistance mechanism mounted to the door and a cooperating trigger mounted to the rail assembly, it should be appreciated that the movement assistance mechanism may instead be mounted to the rail assembly, and that the cooperating trigger may be mounted to the door.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A movement assistance mechanism for a door, the movement assistance mechanism comprising:

a housing extending along a longitudinal axis defining a proximal direction and an opposite distal direction, the housing comprising:

a first track comprising a first proximal end portion and a first distal end portion, the first distal end portion defining a first jog that is angled relative to the longitudinal axis; and a second track comprising a second proximal end portion and a second distal end portion, the second proximal end portion defining a second jog that is angled relative to the longitudinal axis;

a latch mechanism movably mounted in the housing for movement between a proximal home position and a distal cocked position; and a spring engaged between the housing and the latch mechanism and biasing the latch mechanism toward the proximal home position;

wherein, with the latch mechanism in the distal cocked position, a first portion of the latch mechanism is received in the first jog;

wherein, with the latch mechanism in the proximal home position, a second portion of the latch mechanism is received in the second jog; and wherein the second jog is angled to cause a portion of the latch mechanism to retract in a direction transverse to the longitudinal axis as the latch mechanism moves from the distal cocked position to the proximal home position.

2. The movement assistance mechanism of claim 1, wherein the latch mechanism comprises a carriage and a latch body movably mounted to the carriage.

3. The movement assistance mechanism of claim 2, wherein the latch mechanism further comprises:

a first pin coupled to the carriage and engaged with the first track; and an additional pin coupled to the latch body and received in the second track;

wherein the first pin comprises the first portion of the latch mechanism; and wherein the additional pin comprises the second portion of the latch mechanism.

4. The movement assistance mechanism of claim 3, wherein the carriage further comprises a lateral slot that permits lateral movement of the second pin relative to the carriage.

5. The movement assistance mechanism of claim 3, wherein the latch mechanism further comprises a second pin coupled to the carriage and engaged with the first track.

6. The movement assistance mechanism of claim 2, wherein, during movement of the latch mechanism from the distal cocked position to the proximal home position, the latch body laterally moves relative to the carriage.

7. The movement assistance mechanism of claim 1, wherein the first proximal end portion extends parallel to the longitudinal axis.

8. The movement assistance mechanism of claim 1, wherein the second distal end portion comprises an enlarged recess that receives the second portion of the latch mechanism when the latch mechanism is in the distal cocked position.

9. The movement assistance mechanism of claim 1, wherein the latch mechanism comprises:

a carriage engaged with the first track such that the first track is operable to guide movement of the carriage; and a latch body engaged with the second track such that the second track is operable to guide movement of the latch body; and wherein the latch body comprises the portion of the latch mechanism that retracts as the latch mechanism moves from the distal cocked position to the proximal home position.

10. A movement assistance mechanism for a door, the movement assistance mechanism comprising:

a housing defining a first track and a second track, the second track including a longitudinally-extending portion and a proximal jog that extends at an angle relative to the longitudinally-extending portion;

a latch mounted for movement relative to the housing and engaged with the first track such that the first track guides the latch for movement between a proximal home position, a distal cocked position, and an intermediate position between the proximal home position and the distal cocked position, wherein the latch is engaged with the second track such that the proximal jog causes retraction of the latch during movement of the latch from the intermediate position to the proximal home position;

a spring engaged between the housing and the latch, the spring exerting a biasing force urging the latch toward the home position;

a pinion gear rotatably mounted to the housing and positioned at least partially outside the housing;

an intermediate gear rotatably mounted to the housing and positioned inside the housing, wherein the exterior pinion gear is operable to rotate the intermediate gear; and a rack engaged with the intermediate gear such that rotation of the pinion gear causes a corresponding linear movement of the rack;

wherein the rack is coupled with the latch such that rotation of the pinion gear in a first rotational direction distally drives the latch from the home position toward the cocked position, thereby storing mechanical energy in the spring; and wherein the first track is configured to retain the latch in the cocked position against the biasing force of the spring.

11. The movement assistance mechanism of claim 10, further comprising a carriage, wherein the latch is movably mounted to the carriage; and wherein the latch is configured to retract relative to the carriage during movement of the latch from the intermediate position to the proximal home position.

12. The movement assistance mechanism of claim 10, wherein the pinion gear is operable to engage an external rack outside of the movement assistance mechanism such that the external rack is operable to rotate the pinion gear in the first rotational direction to thereby drive the latch toward the cocked position.

13. The movement assistance mechanism of claim 10, wherein the pinion gear is operable to be rotated by an exterior rack such that rotation of the pinion gear by the exterior track causes linear movement of the rack.

14. A movement assistance mechanism, comprising:

a housing extending along a longitudinal axis defining a proximal direction and an opposite distal direction;

a latch mechanism movably mounted in the housing, the latch mechanism comprising:

a carriage movably connected to the housing; and a latch movably mounted to the carriage;

wherein the latch mechanism is movable between a proximal home position and a distal cocked position, and has an intermediate position between the home position and the cocked position; and a spring urging the latch mechanism toward the home position;

wherein the housing further comprises a first track configured to guide the carriage during movement of the latch mechanism, and to retain the latch mechanism in the cocked position against the urging of the spring; and wherein the housing further comprises a second track configured to guide the latch during movement of the latch mechanism, and to cause the latch to retract relative to the carriage as the latch mechanism travels from the intermediate position to the home position.

15. The movement assistance mechanism of claim 14, wherein the housing comprises a longitudinal channel through which the latch projects; and wherein the first track comprises a longitudinal portion and a distal jog, the distal jog extending away from the longitudinal channel.

16. The movement assistance mechanism of claim 15, wherein the carriage comprises a first pin that projects into the first track.

17. The movement assistance mechanism of claim 16, wherein the carriage further comprises a second pin that projects into the first track; and wherein the latch is captured between the first pin and the second pin.

18. The movement assistance mechanism of claim 14, wherein the housing comprises a longitudinal channel through which the latch projects; and wherein the second track comprises a longitudinal portion and a proximal jog, the proximal jog extending away from the longitudinal channel.

19. The movement assistance mechanism of claim 18, wherein the latch comprises a pin that projects into the second track.

* * * * *